(12) United States Patent
Jun et al.

(10) Patent No.: US 12,124,151 B2
(45) Date of Patent: Oct. 22, 2024

(54) CAMERA MODULE

(71) Applicant: Samsung Electro-Mechanics Co., Ltd., Suwon-si (KR)

(72) Inventors: Jae Woo Jun, Suwon-si (KR); Yun Kyoung Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 115 days.

(21) Appl. No.: 17/961,891

(22) Filed: Oct. 7, 2022

(65) Prior Publication Data

US 2023/0146186 A1 May 11, 2023

(30) Foreign Application Priority Data

Nov. 5, 2021 (KR) .......................... 10-2021-0151399

(51) Int. Cl.
| | |
|---|---|
| *G03B 13/36* | (2021.01) |
| *H04N 23/51* | (2023.01) |
| *H04N 23/54* | (2023.01) |
| *H04N 23/55* | (2023.01) |
| *H04N 23/68* | (2023.01) |

(52) U.S. Cl.
CPC .............. *G03B 13/36* (2013.01); *H04N 23/51* (2023.01); *H04N 23/54* (2023.01); *H04N 23/55* (2023.01); *H04N 23/687* (2023.01)

(58) Field of Classification Search
CPC ........ H04N 23/51; H04N 23/54; H04N 23/55; H04N 23/687; H04N 23/57; G03B 13/36; G03B 3/10; G03B 5/00; G03B 5/02; G03B 5/04; G03B 17/12; G03B 2205/0007; G02B 7/09
See application file for complete search history.

(56) References Cited

U.S. PATENT DOCUMENTS

| | | | |
|---|---|---|---|
| 9,137,429 B2 * | 9/2015 | Topliss | ................. H04N 23/687 |
| 2016/0209670 A1 | 7/2016 | Brown et al. | |
| 2017/0289455 A1* | 10/2017 | Hu | .......... H04N 23/57 |
| 2020/0014824 A1* | 1/2020 | Min | ......... G03B 5/00 |

(Continued)

FOREIGN PATENT DOCUMENTS

| | | |
|---|---|---|
| CN | 112698468 A | 4/2021 |
| JP | 2006-38891 A | 2/2006 |
| JP | 2014-10380 A | 1/2014 |

(Continued)

OTHER PUBLICATIONS

Machine Translation.*

(Continued)

*Primary Examiner* — Kelly L Jerabek
(74) *Attorney, Agent, or Firm* — NSIP Law

(57) ABSTRACT

A camera module includes a housing having an internal space, a lens module disposed in the internal space to be slidably movable with respect to the housing, and a driving portion configured to provide a driving force to move the lens module in an optical axis direction. The driving portion includes a wire portion having a length that changes as power is applied to the wire portion, the lens module comprises a guide portion configured to guide a movement of the lens module in the optical axis direction, and the wire portion is in contact with and supported by the guide portion.

17 Claims, 20 Drawing Sheets

(56) References Cited

U.S. PATENT DOCUMENTS

2021/0294069 A1* 9/2021 Miller .................. G02B 7/09
2021/0329170 A1   10/2021 Osaka

FOREIGN PATENT DOCUMENTS

| JP | 2020-30306 A | | 2/2020 |
| KR | 10-2012-0010299 | * | 2/2012 |
| KR | 10-2012-0010299 A | | 2/2012 |
| KR | 10-2015-0102002 A | | 9/2015 |

OTHER PUBLICATIONS

Machine Translation of Specification of KR-10-2012-0010299 filed on Feb. 3, 2012 (Year: 2012).*

Korean Office Action issued on Jul. 3, 2023, in counterpart Korean Patent Application No. 10-2021-0151399 (7 pages in English, 5 pages in Korean).

* cited by examiner

CAMERA MODULE

CROSS-REFERENCE TO RELATED APPLICATIONS

This application claims the benefit under 35 USC 119(a) of Korean Patent Application No. 10-2021-0151399 filed on Nov. 5, 2021, in the Korean Intellectual Property Office, the entire disclosure of which is incorporated herein by reference for all purposes.

BACKGROUND

1. Field

The present disclosure relates to a camera module.

2. Description of Related Art

Recently, camera modules have become standard in portable electronic devices such as mobile terminals, tablet personal computers (PCs), laptop computers, and smartphones. An autofocusing (AF) function and an optical image stabilization (OIS) function have been added to camera modules provided in mobile terminals.

Actuators moving a lens in an optical axis direction and a direction perpendicular to the optical axis direction are provided in a camera module to perform an AF function and an OIS function.

In the related art, an actuator may move a lens using driving force generated by a magnet and a coil.

When a lens is moved using an actuator including a magnet and a coil according to the related art, sizes of the magnet and the coil included in the actuator may cause difficulty in miniaturization of a camera module.

In addition, in an actuator including a magnet and a coil, a magnetic field generated by the magnet and the coil may have an electromagnetic effect on the other components of a camera module or other electronic components outside the camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space; a lens module disposed in the internal space of the housing to be slidably movable with respect to the housing; and a driving portion configured to provide a driving force to move the lens module in an optical axis direction, wherein the driving portion includes a wire portion having a length that changes as power is applied to the wire portion, the lens module includes a guide portion configured to guide a movement of the lens module in the optical axis direction, and the wire portion is in contact with and supported by the guide portion.

The guide portion may be in contact with an internal side surface of the housing.

The guide portion may include a guide projection protruding from a side surface of the lens module toward an internal side surface of the housing in a direction perpendicular to the optical axis direction.

The internal side surface of the housing may include a guide groove accommodating at least a portion of the guide projection.

The guide groove may extend in the optical axis direction.

The guide portion may include a first guide portion protruding in a first direction perpendicular to the optical axis direction, and a second guide portion protruding in a second direction perpendicular to both the optical axis direction and the first direction.

The wire portion may be in contact with and supported by the first guide portion and the second guide portion.

The wire portion may include a first wire and a second wire, and the first wire and the second wire may be curved in opposing directions with respect to the guide portion.

The camera module may further include two first wire pins disposed in the housing; and two second wire pins disposed in the housing, wherein opposite ends of the first wire may be fixed to the first wire pins, and opposite ends of the second wire may be fixed to the second wire pins.

The camera module may further include a fixing projection disposed in the housing to support the first wire and the second wire, and the first wire and the second wire may be disposed to be spaced apart from each other in a direction perpendicular to the optical axis direction.

The fixing projection may include a first groove in which the first wire is disposed; and a second groove in which the second wire is disposed, and the first groove and the second groove may be spaced apart from each other in a direction perpendicular to the optical axis direction.

The camera module may further include an image sensor module coupled to the housing, wherein the image sensor module may include an image sensor; a first sensor driving portion configured to move the image sensor in a first direction perpendicular to the optical axis direction; and a second sensor driving portion configured to move the image sensor in a second direction perpendicular to both the optical axis direction and the first direction, and the image sensor and the first sensor driving portion may be moved together by the second sensor driving portion.

The first sensor driving portion may include a moving plate on which the image sensor is disposed; a first lever rotatably disposed on the moving plate and configured to move the image sensor; and a wire connected to the first lever and having a length that changes in response to power being applied to the wire connected to the first lever.

The second sensor driving portion may include a base on which the first sensor driving portion is disposed; a second lever rotatably disposed on the base and configured to move the first sensor driving portion; and a wire connected to the second lever and having a length that changes in response to power being applied to the wire connected to the second lever.

The image sensor module may further include a circuit board electrically connected to the image sensor, and at least a portion of the circuit board may be configured to be flexible.

In another general aspect, an image sensor module includes an image sensor; and a first sensor driving portion configured to move the image sensor in a first direction parallel to a surface of the image sensor, wherein the first sensor driving portion includes a first wire having a length that changes in a second direction in response to power being applied to the first wire, the second direction being perpendicular to the first direction and parallel to the surface of the image sensor, and the first sensor driving portion is further configured to move the image sensor in the first direction in response to the length of the first wire changing in the second direction in response to the power being applied to the first wire.

The first sensor driving portion may further include a first lever having a first end connected to one end of the first wire and configured to rotate and move the image sensor in the first direction in response to the length of the first wire changing in the second direction in response to the power being applied to the first wire.

The image sensor module may further include a frame in which the image sensor is disposed; a plate; and two first guide units disposed on opposite edges of the plate in the second direction, wherein the two first guide units may be configured to support the frame so that the frame is movable in the first direction, and the first lever may be rotatably mounted on the plate so that a second end of the first lever contacts the frame and pushes the frame and the image sensor in the first direction in response to the length of the first wire changing in the second direction in response to the power being applied to the first wire.

The image sensor module may further include a second sensor driving portion configured to move the image sensor in the second direction, wherein the second sensor driving portion may include a second wire having a length that changes in the first direction in response to power being applied to the second wire, and the second sensor driving portion may be further configured to move the image sensor in the second direction in response to the length of the second wire changing in the first direction in response to the power being applied to the second wire.

The first sensor driving portion may further include a first lever having a first end connected to one end of the first wire and configured to rotate and move the image sensor in the first direction in response to the length of the first wire changing in the second direction in response to the power being applied to the first wire, and the second sensor driving portion may further include a second lever having a first end connected to one end of the second wire and configured to rotate and move the image sensor in the second direction in response to the length of the second wire changing in the first direction in response to the power being applied to the second wire.

The image sensor module may further include a frame in which the image sensor is disposed; a moving plate; two first guide units disposed on opposite edges of the moving plate in the second direction; a base; and two second guide units disposed on opposite edges of the base in the first direction, wherein the two first guide units may be configured to support the frame so that the frame is movable in the first direction, the first lever may be rotatably mounted on the moving plate so that a second end of the first lever contacts the frame and pushes the frame and the image sensor in the first direction in response to the length of the first wire changing in the second direction in response to the power being applied to the first wire, the two second guide units may be configured to support the moving plate so that the moving plate is movable in the second direction, and the second lever may be rotatably mounted on the base so that a second end of the second lever contacts one of the two first guide units and pushes the movable plate, the frame, and the image sensor in the second direction in response to the length of the second wire changing in the first direction in response to the power being applied to the second wire.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
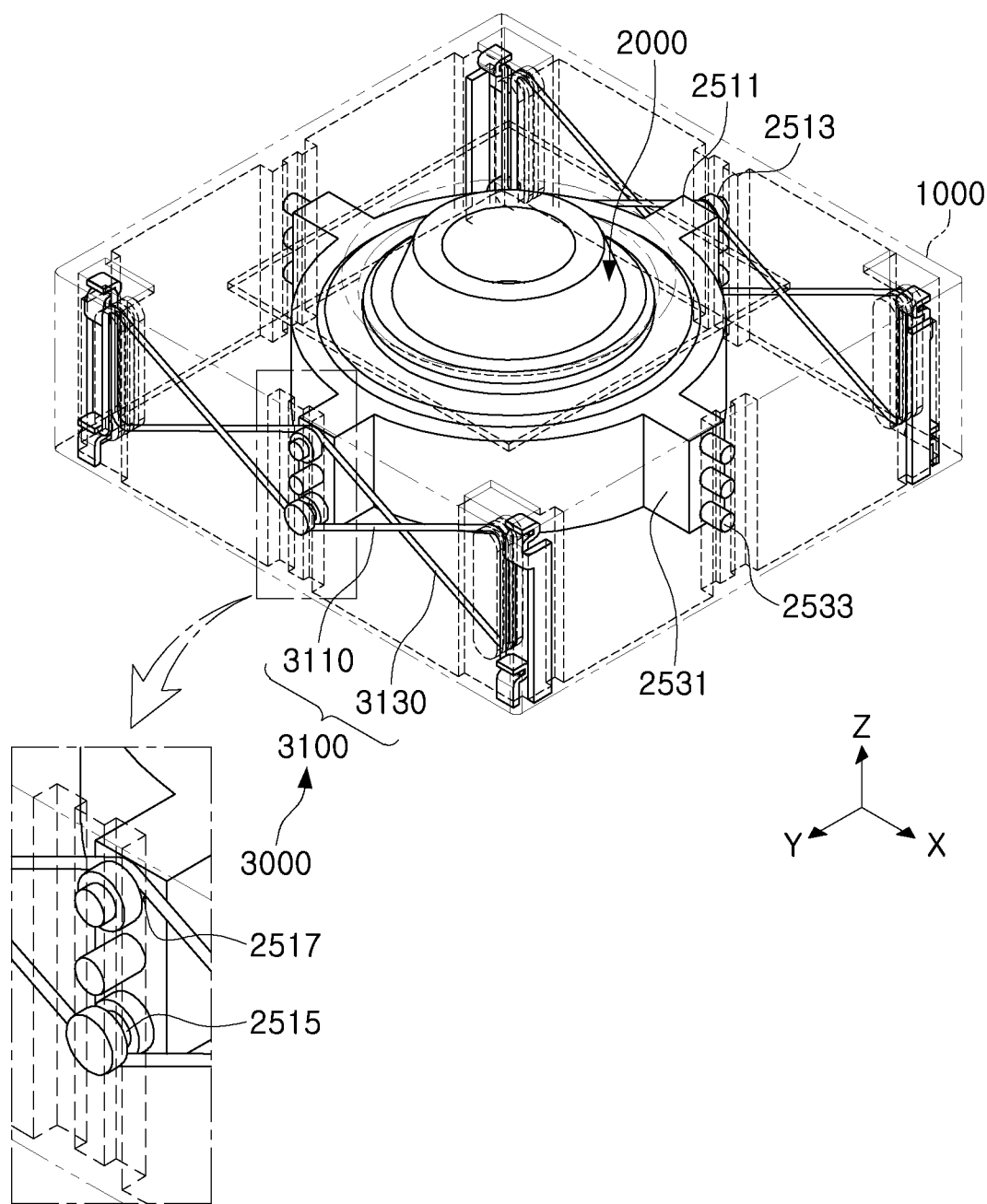
FIG. 1 is a schematic perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

A camera module according to an example may be mounted in a mobile electronic device. The mobile electronic device may be a portable electronic device such as a mobile communications terminal, a smartphone, or a table personal computer (PC).

Figure 2:
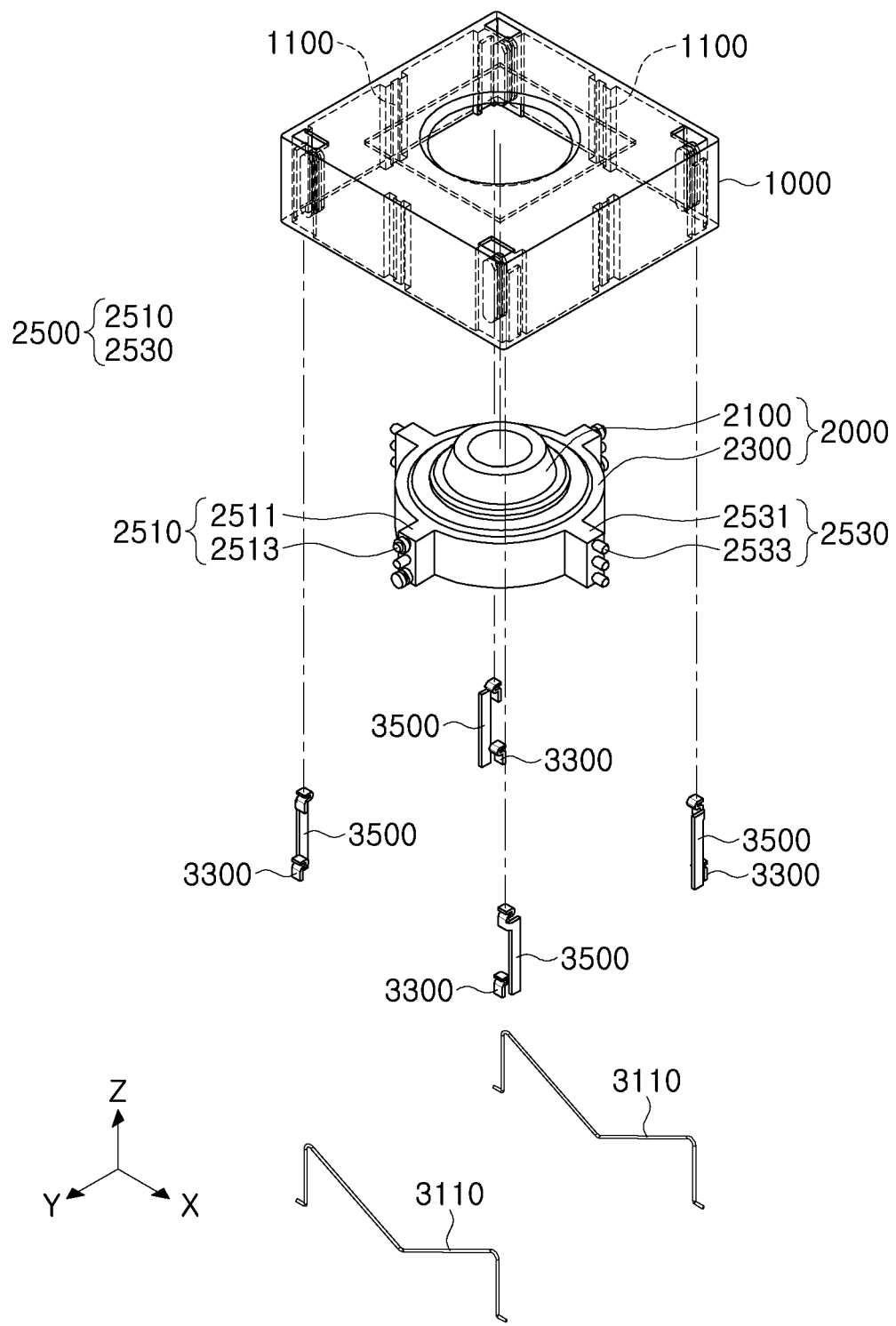
FIG. 2 is a partially exploded perspective view of a camera module according to an example.
Figure 3:
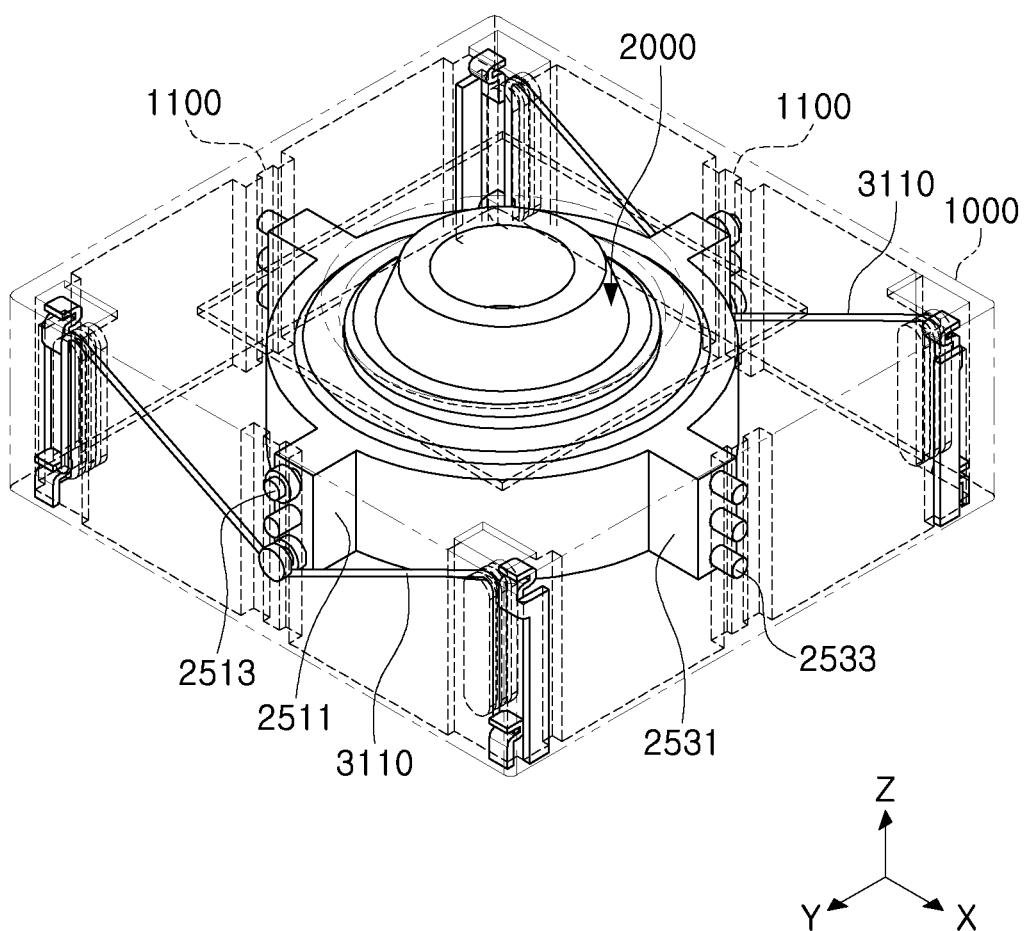
FIG. 3 is an assembled perspective view of elements illustrated in FIG. 2.
Figure 4:
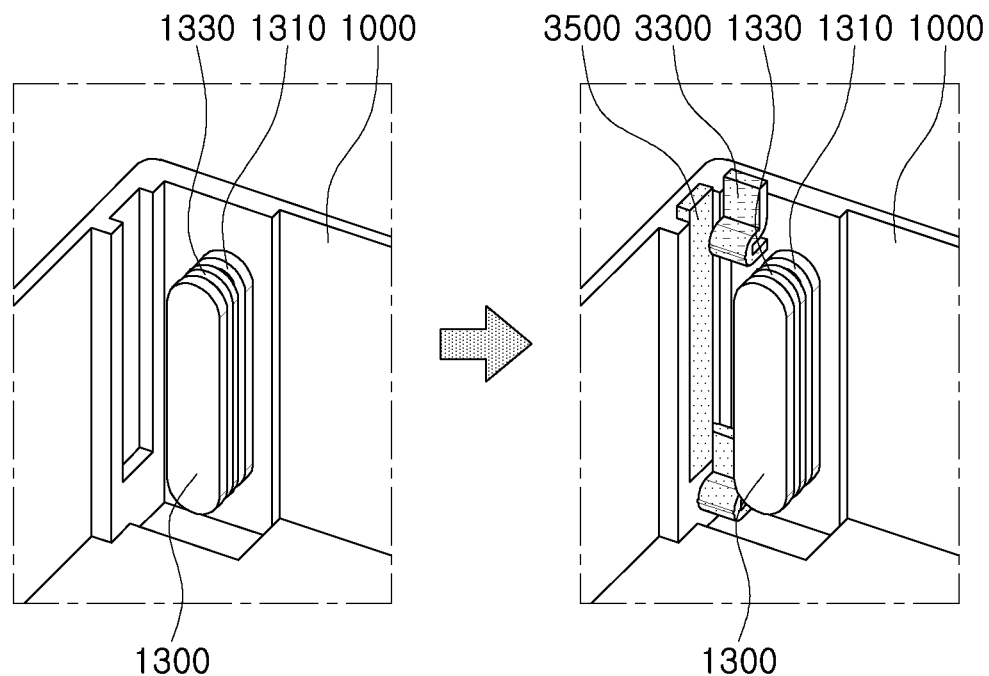
FIG. 4 is a diagram illustrating an example in which a first wire pin and a second wire pin are coupled to a housing.
Figure 5:
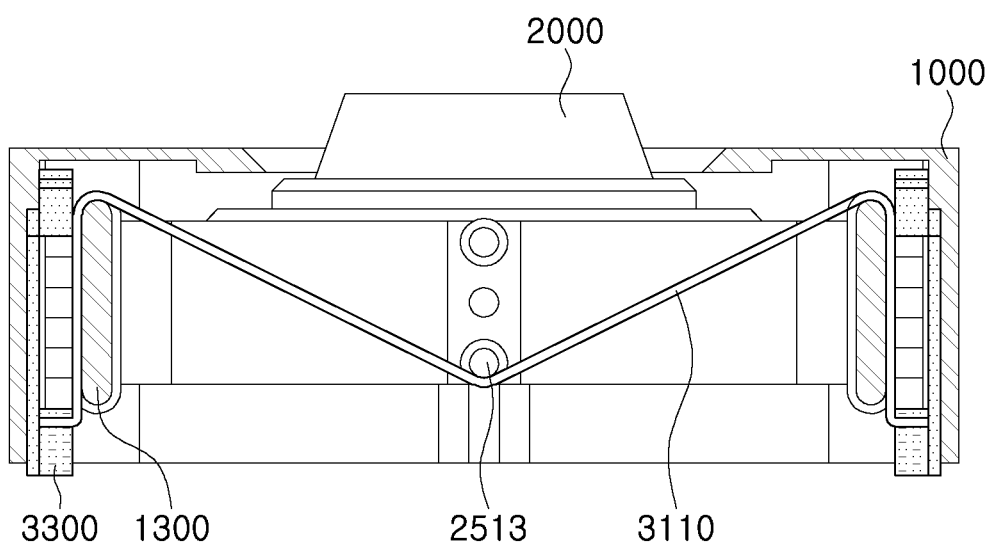
FIG. 5 is a side cross-sectional view of FIG. 3.
Figure 6:
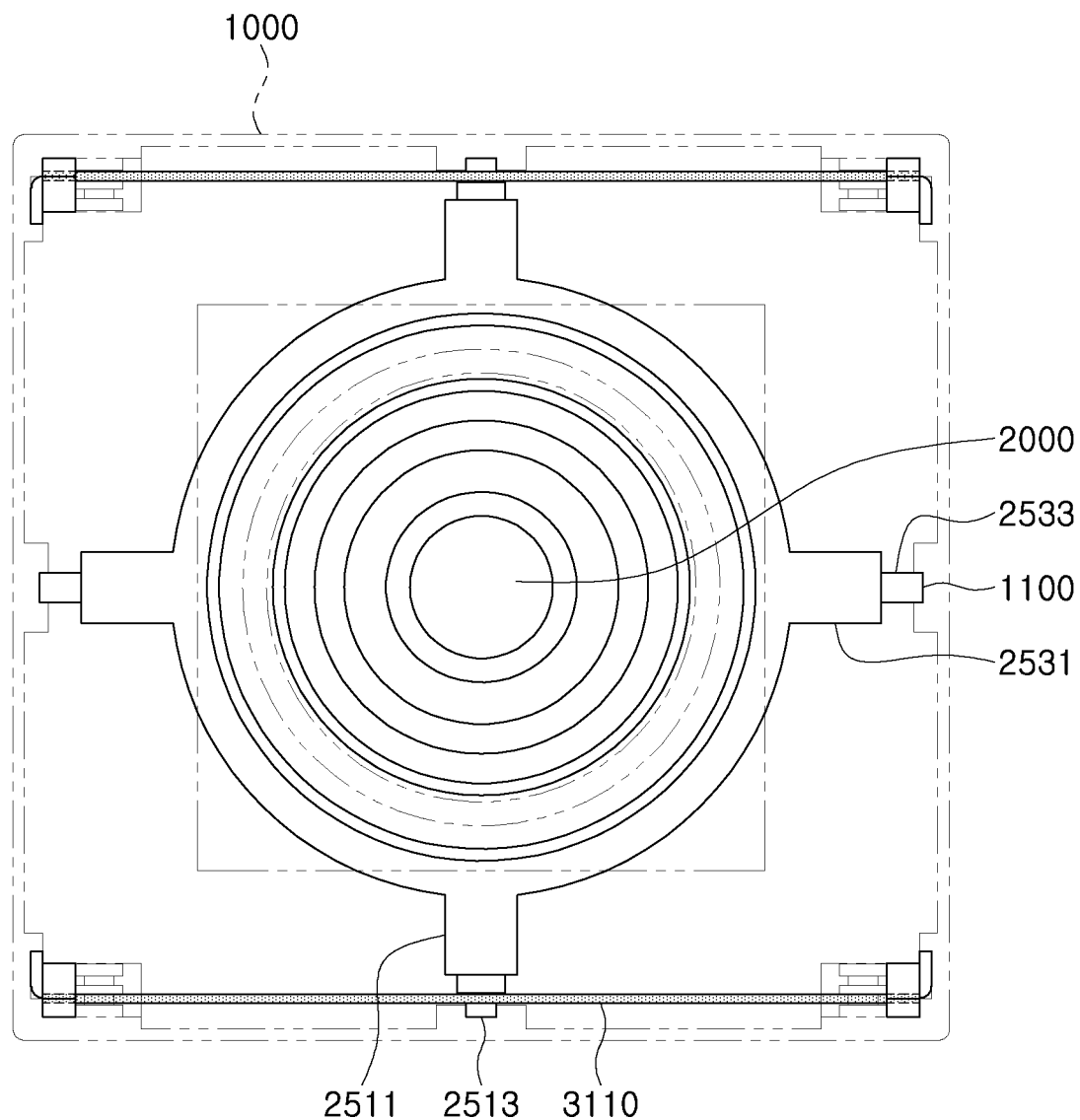
FIG. 6 is a plan view of FIG. 2.

FIG. 1 is a schematic perspective view of a camera module according to an example, FIG. 2 is a partially exploded perspective view of a camera module according to an example, FIG. 3 is an assembled perspective view of elements illustrated in FIG. 2, FIG. 4 is a diagram illustrating an example in which a first wire pin and a second wire pin are coupled to a housing, FIG. 5 is a side cross-sectional view of FIG. 3, and FIG. 6 is a plan view of FIG. 2.

Referring to FIG. 1, a camera module according to an example includes a lens module 2000, a housing 1000, and a driving portion 3000.

The lens module 2000 may include a lens barrel 2100 in which at least one lens is disposed. At least one lens may be disposed inside the lens barrel 2100. When a plurality of lenses are provided, the plurality of lenses are mounted in the lens barrel 2100 in an optical axis (a Z-axis) direction.

The lens module 2000 may further include a lens holder 2300 coupled to the lens barrel 2100.

The lens holder 2300 may be include a hole penetrating through the lens holder 2300 in an optical axis (Z-axis) direction, and the lens barrel 2100 may be inserted into the hole of the lens holder 2300 to be fixedly disposed with respect to the lens holder 2300.

The lens module 2000 may be disposed in an internal space of the housing 1000, and may be moved in the optical axis (Z-axis) direction to perform an autofocusing (AF) function.

In an example, the lens module 2000 may be a movable member moved in the optical axis (Z-axis) direction during autofocusing (AF). To this end, the camera module according to an example may include the driving portion 3000.

The lens module 2000 may be moved in the optical axis (Z-axis) direction by the driving portion 3000 to focus lenses in the lens module 2000 on a subject.

The driving portion 3000 may include a wire portion 3100 having a length that changes when power is applied to the wire portion 3100. The wire portion 3100 may include a plurality of wires, and each of the plurality of wires may be a shape memory alloy wire.

For example, the wire portion 3100 may include a first wire 3110 moving the lens module 2000 upwardly in the optical axis (Z-axis) direction, and a second wire 3130 moving the lens module 2000 downwardly in the optical axis (Z-axis) direction.

The lens module 2000 may be relatively moved in the optical axis (Z-axis) direction with respect to the housing 1000 by a driving force generated depending on the change in the length of the first wire 3110 and the second wire 3130.

A structure moving the lens module 2000 upwardly in the optical axis (Z-axis) direction will be described with reference to FIGS. 2 to 6.

The lens module 2000 may be moved relative to the housing 1000 by the driving portion 3000. The lens module 2000 may include a guide portion 2500 guiding the movement of the lens module 2000 in the optical axis (Z-axis) direction.

The guide portion 2500 may be disposed on a side surface of the lens module 2000 to be in contact with and supported by an internal side surface of the housing 1000. For example, the guide portion 2500 may be moved in the optical axis (Z-axis) direction while being supported by the housing 1000.

For example, the lens module 2000 may be slidably moved with respect to the housing 1000 while at least a portion of the guide portion 2500 is in contact with the internal side surface of the housing 1000.

The internal side surface of the housing 1000 may be provided with a guide groove 1100 accommodating at least a portion of the guide portion 2500 therein. The guide groove 1100 may extend to have a length in the optical axis (Z-axis) direction.

Accordingly, the lens module 2000 may be guided to move in a direction parallel to the optical axis (Z-axis) with respect to the housing 1000 by the guide portion 2500 and the guide groove 1100.

The guide groove 1100 may be provided with a lubricant to reduce a frictional force generated by the movement of the guide portion 2500.

A number of guide portions 2500 equal to a number of guide grooves 1100 may be provided. For example, four guide portions 2500 and four guide groove 1100 may be provided.

The guide portion 2500 may include a first guide portion 2510 and a second guide portion 2530 protruding from the side surface of the lens module 2000 toward the internal side surface of the housing 1000 in a direction perpendicular to the optical axis (Z-axis) direction.

As an example, the guide portion 2500 may include a first guide portion 2510 protruding in a second direction (a Y-axis direction) perpendicular to the optical axis (Z-axis) direction, and a second guide portion 2530 protruding in a first direction (an X-axis direction) perpendicular to both the optical axis (Z-axis) direction and the second direction (the Y-axis direction).

In an example, each of the first guide portion 2510 and the second guide portion 2530 may include a protrusion protruding from a side surface of the lens module 2000, and a guide projection protruding from the protrusion.

A configuration of the protrusion may be added as necessary, and each of the guide portions 2510 and 2530 may include only a guide projection.

In an example, the guide projection may be configured so that a portion contacting the internal side surface of the housing 1000 has a rounded shape. For this reason, the guide projection may be in point contact with the internal side surface of the housing 1000. Thus, a frictional force generated during movement may be reduced.

The first guide portion 2510 may include a first protrusion 2511 protruding from the side surface of the lens module 2000 in the second direction (the Y-axis direction), and a first guide projection 2513 protruding from the first protrusion 2511.

The second guide portion 2530 may include a second protrusion 2531 protruding from the side surface of the lens module 2000 in the first direction (the X-axis direction), and a second guide projection 2533 protruding from the second protrusion 2531.

The driving portion 3000 may include a first wire 3110 and a first wire pin 3300. A length of the first wire 3110 may change as power is applied to the first wire 3110. For example, the first wire 3110 may be a shape memory alloy wire.

The first wire 3110 may include a pair of wires spaced apart from each other in the second direction (the Y-axis direction).

The lens module 2000 may be moved upwardly in the optical axis (Z-axis) direction by a driving force generated according to the change in the length of the first wire 3110.

The change in the length of the first wire 3110 may be proportional to the magnitude of a voltage or current applied to the first wire 3110, or may be proportional to a time for which power is applied.

The first wire 3110 may be disposed to be in contact with and supported by the guide portion 2500 of the lens module 2000. For example, the first wire 3110 may be in contact with and supported by the first guide portion 2510 or the second guide portion 2530 of the lens module 2000.

The following description will be provided with respect to an example in which the first wire 3110 is in contact with and supported by the first guide portion 2510 of the lens module 2000.

The first wire 3110 may be disposed to be bent with respect to the first guide portion 2510.

When the first wire 3110 is disposed to span the first guide portion 2510, the first guide portion 2510 may be pushed upwardly in the optical axis (Z-axis) direction as the length of the first wire 3110 changes.

The guide portion 2510 may be provided with a first accommodation groove 2515 in which the first wire 3110 is accommodated.

Opposite ends of the first wire 3110 may be fixed to the first wire pin 3300. The first wire pin 3300 may be coupled to the housing 1000, and may be made of a conductive material. Power may be applied to the first wire 3110 by the first wire pin 3300.

A fixing projection 1300 supporting the first wire 3110 may be disposed in the housing 1000. The fixing projection 1300 may be provided with a first groove 1310 in which the first wire 3110 is accommodated. The first groove 1310 may extend along a periphery of the fixing projection 1300.

A portion of the first wire 3110 may be bent to be fitted into the first groove 1310 of the fixing projection 1300.

Figure 7:
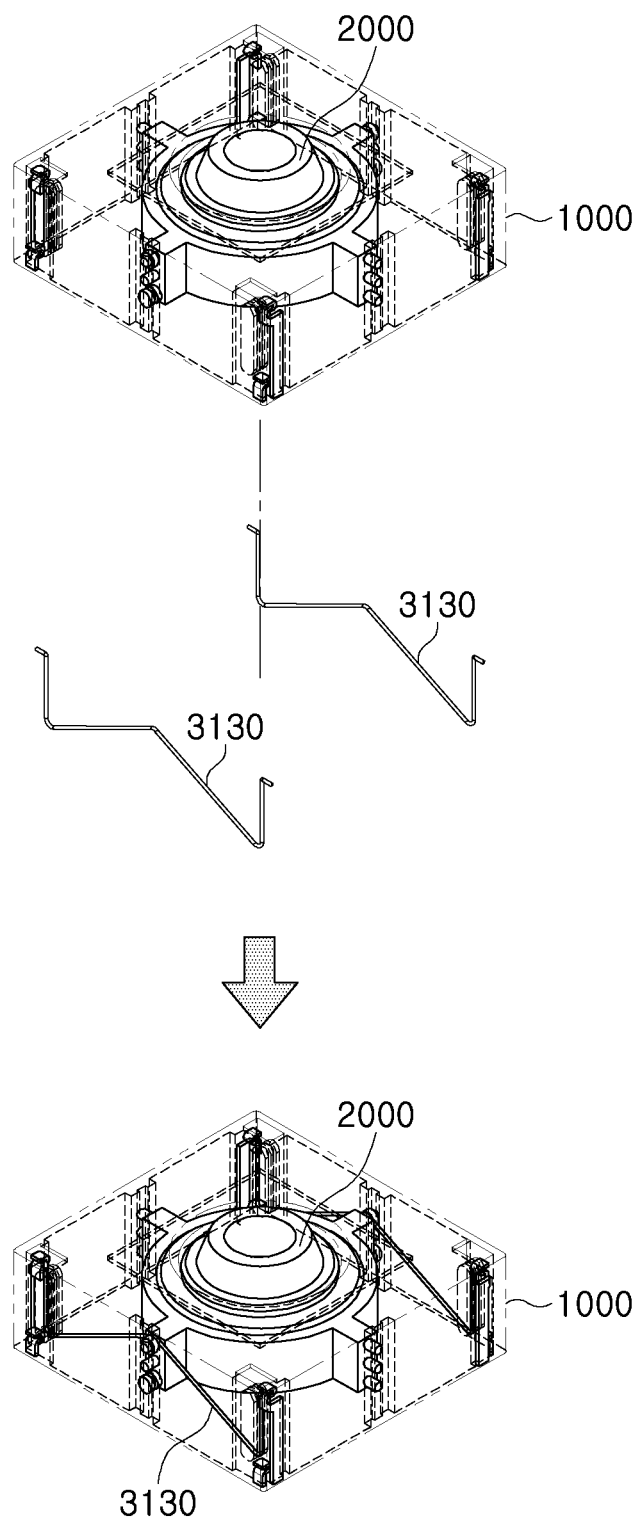
FIG. 7 is a schematic perspective view of a camera module according to an example.
Figure 8:
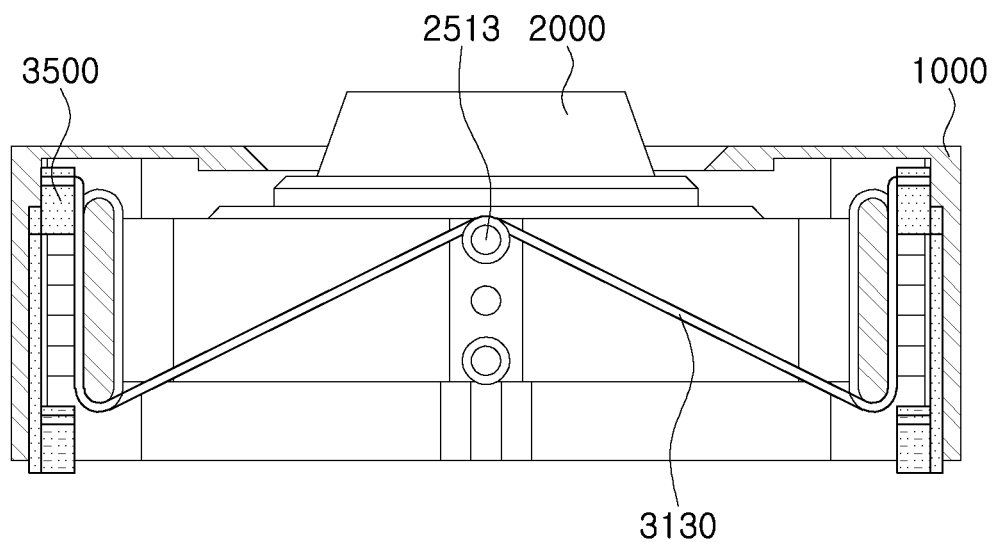
FIG. 8 is a side cross-sectional view of FIG. 7.
Figure 9:
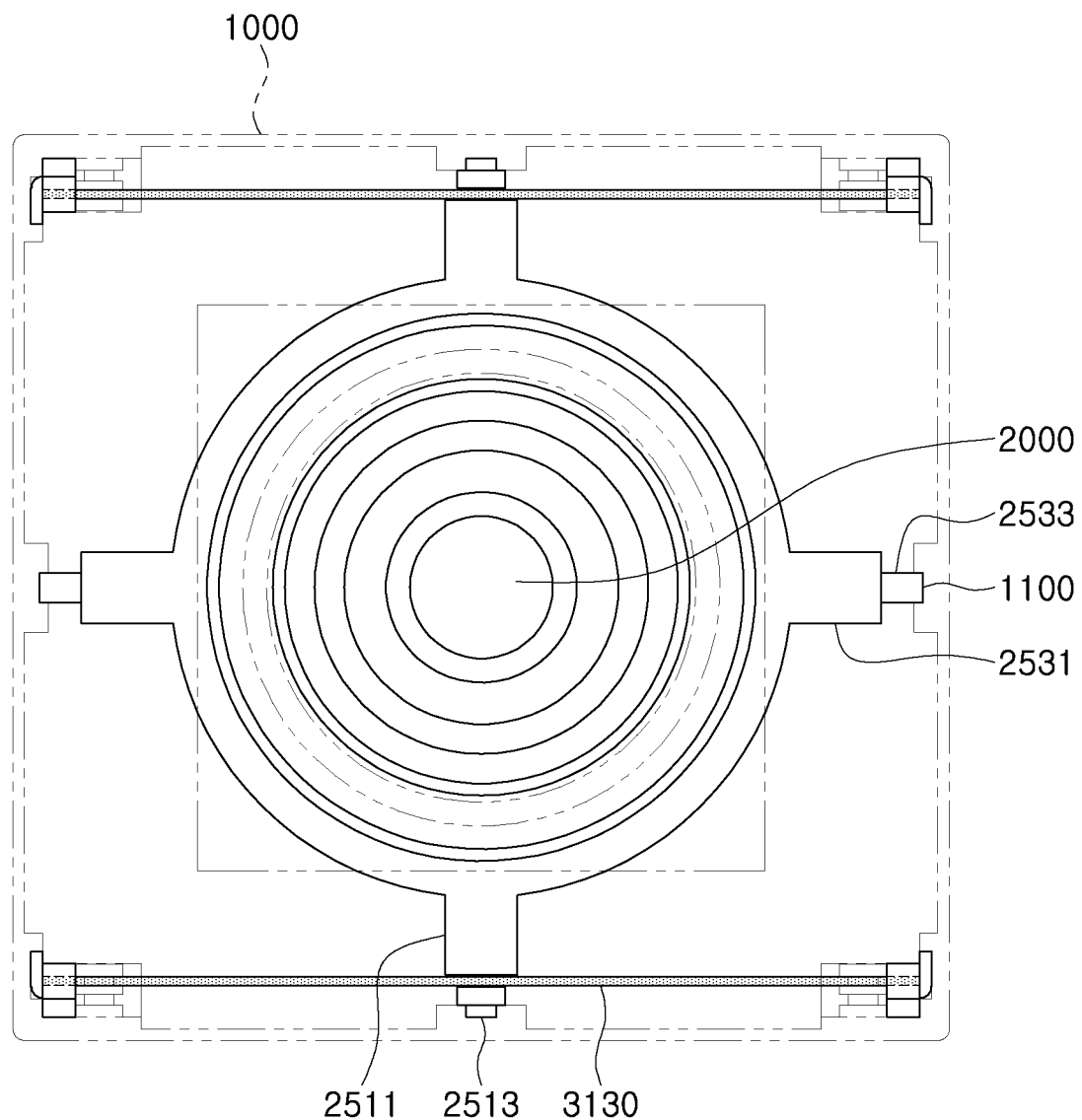
FIG. 9 is a plan view of FIG. 7.

FIG. 7 is a schematic perspective view of a camera module according to an example, FIG. 8 is a side cross-sectional view of FIG. 7, and FIG. 9 is a plan view of FIG. 7.

A structure moving the lens module 2000 downwardly in the optical axis (Z-axis) direction will be described with reference to FIGS. 7 to 9.

The driving portion 3000 may include a second wire 3130 and a second wire pin 3500. A length of the second wire 3130 may change as power is applied to the second wire 3130. For example, the second wire 3130 may be a shape memory alloy wire.

The second wire 3130 may include a pair of wires spaced apart from each other in the second direction (the Y-axis direction).

The lens module 2000 may be moved downwardly in the optical axis (Z-axis) direction by a driving force generated depending on the change in the length of the second wire 3130.

The change in the length of the second wire 3130 may be proportional to the magnitude of a voltage or current applied to the second wire 3130, or may be proportional to a time for which power is applied.

The second wire 3130 may be disposed to be in contact with and supported by the guide portion 2500 of the lens module 2000. For example, the second wire 3130 may be in contact with and supported by the first guide portion 2510 or the second guide portion 2530 of the lens module 2000.

The following description will be provided with respect to an example in which the second wire 3130 is in contact with and supported by the first guide portion 2510 of the lens module 2000.

The second wire 3130 may be disposed to be bent with respect to the first guide portion 2510.

When the second wire 3130 is disposed to span the first guide portion 2510, the first guide portion 2510 may be moved downwardly in the optical axis (Z-axis) direction as the length of the second wire 3130 changes.

The first wire 3110 and the second wire 3130 may be bent in opposite directions with respect to the first guide portion 2510. Accordingly, the driving force generated by the first wire 3110 and the driving force generated by the second wire 3130 may be applied in opposite directions.

The first guide portion 2510 may be provided with a second accommodation groove 2517 in which the second wire 3130 is accommodated.

The first accommodation groove 2515 in which the first wire 3110 is accommodated and the second accommodation groove 2517 in which the second wire 3130 is accommodated may be different in terms of locations in the optical axis (Z-axis) direction and the second direction (the Y-axis direction).

The first wire 3110 and the second wire 3130 may be spaced apart from each other in the second direction (the Y-axis direction).

Opposite ends of the second wire 3130 may be fixed to the second wire pin 3500. The second wire pin 3500 may be coupled to the housing 1000, and may be made of a conductive material. Power may be applied to the second wire 3130 by the second wire pin 3500.

The fixing projection 1300 supporting the second wire 3130 may be disposed in the housing 1000. The fixing projection 1300 may be provided with a second groove 1330 in which the second wire 3130 is accommodated. The second groove 1330 may extend along a periphery of the fixing projection 1300.

The first groove 1310 in which the first wire 3110 is accommodated and the second groove 1330 in which the second wire 3130 is accommodated may be disposed to be spaced apart from each other in the second direction (the Y-axis direction).

A portion of the second wire 3130 may be bent to be fitted into the second groove 1330 of the fixing projection 1300.

Figure 10:
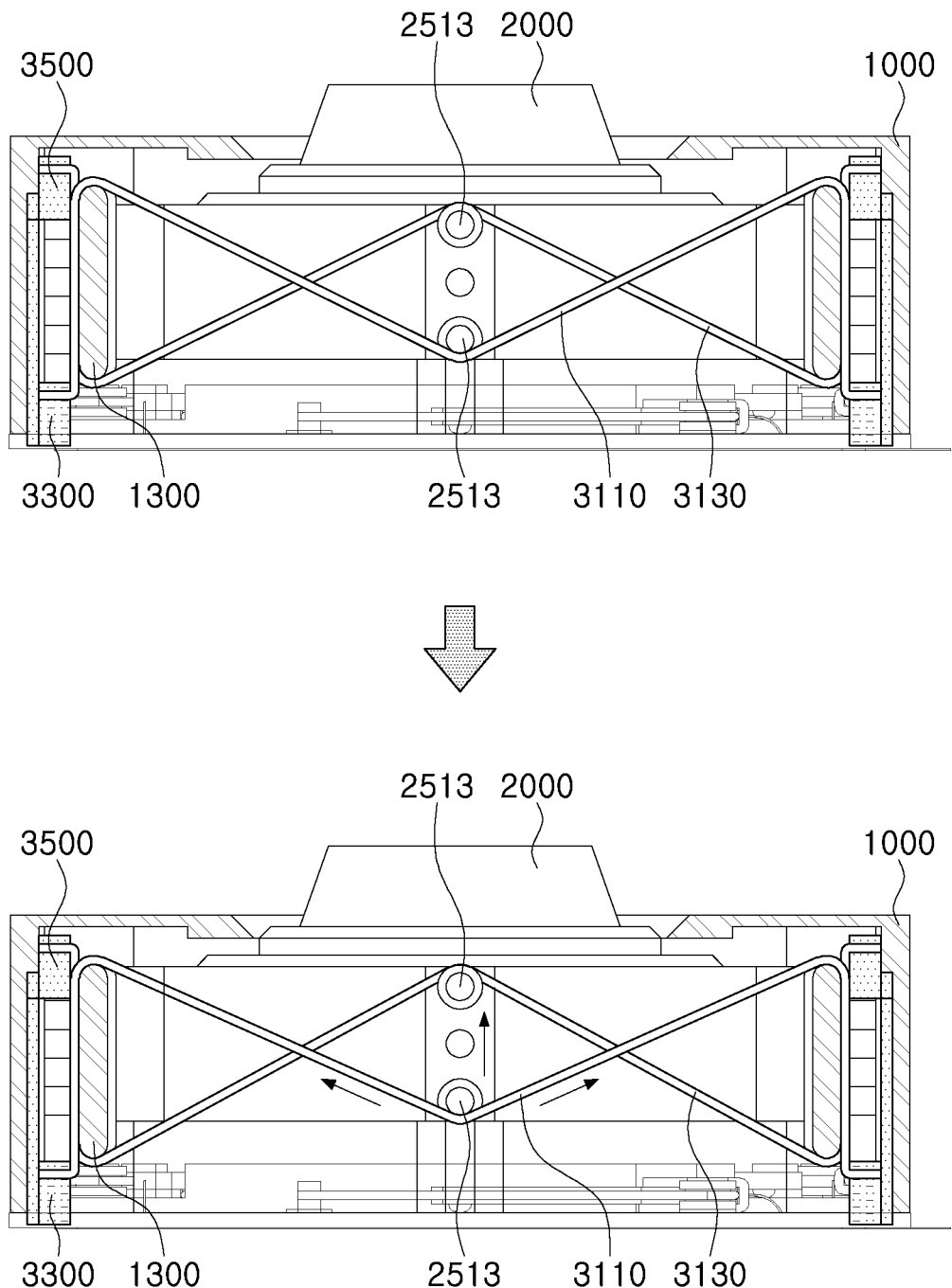
FIG. 10 is a view illustrating a state in which a lens module is moved upwardly in an optical axis (Z-axis) direction in a camera module according to an example.
Figure 11:
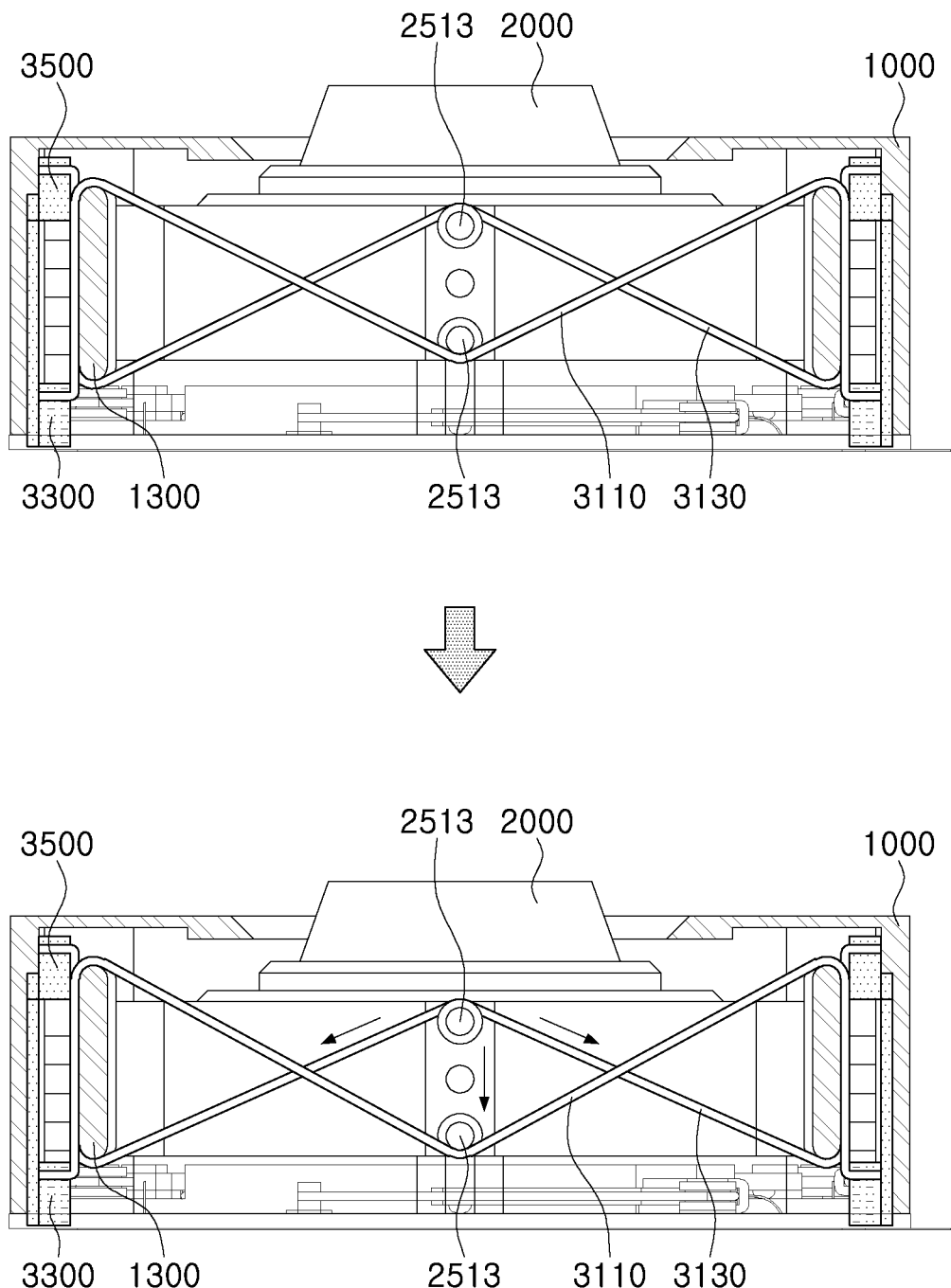
FIG. 11 is a view illustrating a state in which a lens module is moved downwardly in an optical axis (Z-axis) direction in a camera module according to an example.

FIG. 10 is a view illustrating a state in which a lens module is moved upwardly in an optical axis (Z-axis) direction in a camera module according to an example, and FIG. 11 is a view illustrating a state in which a lens module is moved downwardly in an optical axis (Z-axis) direction in a camera module according to an example.

Referring to FIG. 10, as power is applied to the first wire 3110, the length of the first wire 3110 may change to move the lens module 2000 upwardly in the optical axis (Z-axis) direction.

Referring to FIG. 11, as power is applied to the second wire 3130, the length of the second wire 3130 may change to move the lens module 2000 downwardly in the optical axis (Z-axis) direction.

Figure 12:
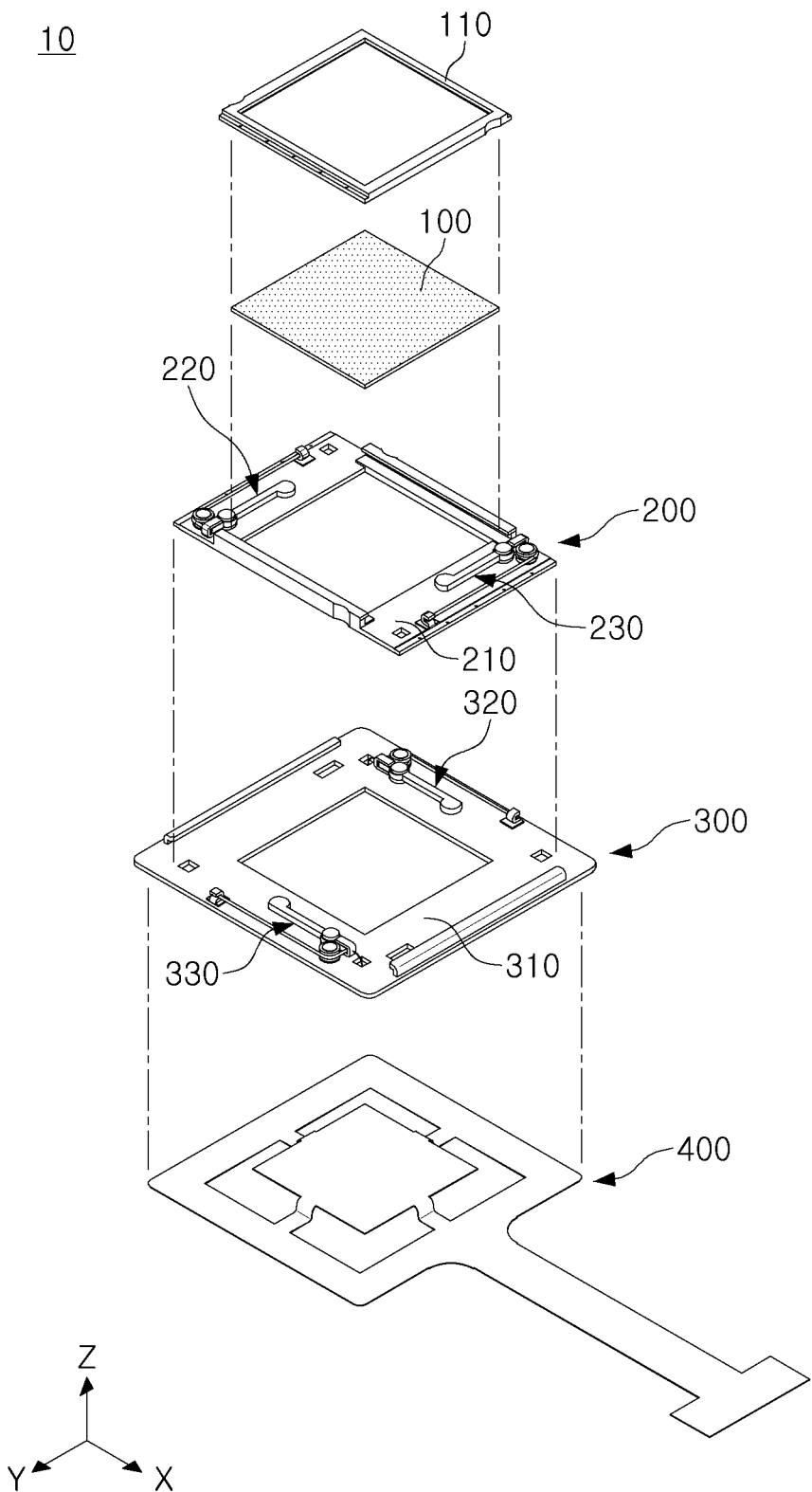
FIG. 12 is an exploded perspective view of an image sensor module according to an example.

FIG. 12 is an exploded perspective view of an image sensor module according to an example.

The camera module according to an example may further include an image sensor module 10. The image sensor module 10 may be coupled to the housing 1000.

The image sensor module 10 may move the image sensor 100 in a direction perpendicular to an optical axis (Z-axis) direction to correct shake at the time of capturing an image.

For example, referring to FIG. 12, the image sensor module 10 may move the image sensor 100 on a plane perpendicular to an optical axis (a Z-axis) in response to the shaking of the camera module to perform an optical image stabilization (OIS) function.

The image sensor module 10 may include an image sensor 100, a frame 110 on which the image sensor 100 is mounted, a first sensor driving portion 200 movably supporting the frame 110, a second sensor driving portion 300 movably supporting the first sensor driving portion 200, and a circuit board 400 electrically connected to the image sensor 100.

At least a portion of the circuit board 400 may be configured to be flexible.

The image sensor 100, the first sensor driving portion 200, the second sensor driving portion 300, and the circuit board 400 may be disposed in an optical axis (Z-axis) direction of a lens module 2000.

For example, as illustrated in FIG. 12, the image sensor 100 may be provided on the first sensor driving portion 200, the first sensor driving portion 200 may be provided on the second sensor driving portion 300, and the second sensor driving portion 300 may be provided on the circuit board 400.

The image sensor 100, the first sensor driving portion 200, the second sensor driving portion 300, and the circuit board 400 may be sequentially stacked and disposed in the optical axis (Z-axis) direction.

The image sensor 100 may be coupled to the frame 110 to be movable with respect to the first sensor driving portion 200. For example, as illustrated in FIG. 12, the frame 110 coupled to the image sensor 100 may be provided to be movable in a direction (for example, an X-axis direction and/or a Y-axis direction) perpendicular to the optical axis (Z-axis) direction on an upper surface of the first sensor driving portion 200.

The first sensor driving portion 200 may move the frame 110 to which the image sensor 100 is coupled in a first direction (for example, the X-axis direction) perpendicular to the optical axis (the Z-axis).

The first sensor driving portion 200 may include a moving plate 210 movably supporting the image sensor 100, and one or more driving units 220 and 230 moving the image sensor 100.

The second sensor driving portion 300 may move the first sensor driving portion 200 in a direction different from the first direction (the X-axis direction). For example, the second sensor driving portion 300 may move the first sensor driving portion 200 in a second direction (for example, the Y-axis direction) perpendicular to both the optical axis (Z-axis) direction and the first direction (the X-axis direction).

The second sensor driving portion 300 may include a base 310 movably supporting the moving plate 210 of the first sensor driving portion 200, and one or more driving units 320 and 330 moving the moving plate 210.

In examples, the second sensor driving portion 300 may move the first sensor driving portion 200 and the image sensor 100 together. For example, when the first sensor driving portion 200 is moved in the second direction (the Y-axis direction) by the second sensor driving portion 300, the image sensor 100 supported by the first sensor driving portion 200 may also be moved together with the first sensor driving portion 200 in the same direction as the first sensor driving portion 200.

The image sensor module 10 according to examples may move the image sensor 100 in the first direction (the X-axis direction) and/or the second direction (the Y-axis direction) to perform an optical image stabilization (OIS) function.

The circuit board 400 may be provided below the second sensor driving portion 300. The circuit board 400 may be electrically connected to the image sensor 100 to receive image information from the image sensor 100.

The circuit board 400 may be electrically connected to one or more driving units 220, 230, 320, and 330 included in the first sensor driving portion 200 and the second sensor driving portion 300 to apply power to the driving units 220, 230, 320, and 330 and to transmit a control signal.

Hereinafter, the first sensor driving portion 200 according to examples will be described with reference to FIG. 13.

Figure 13:
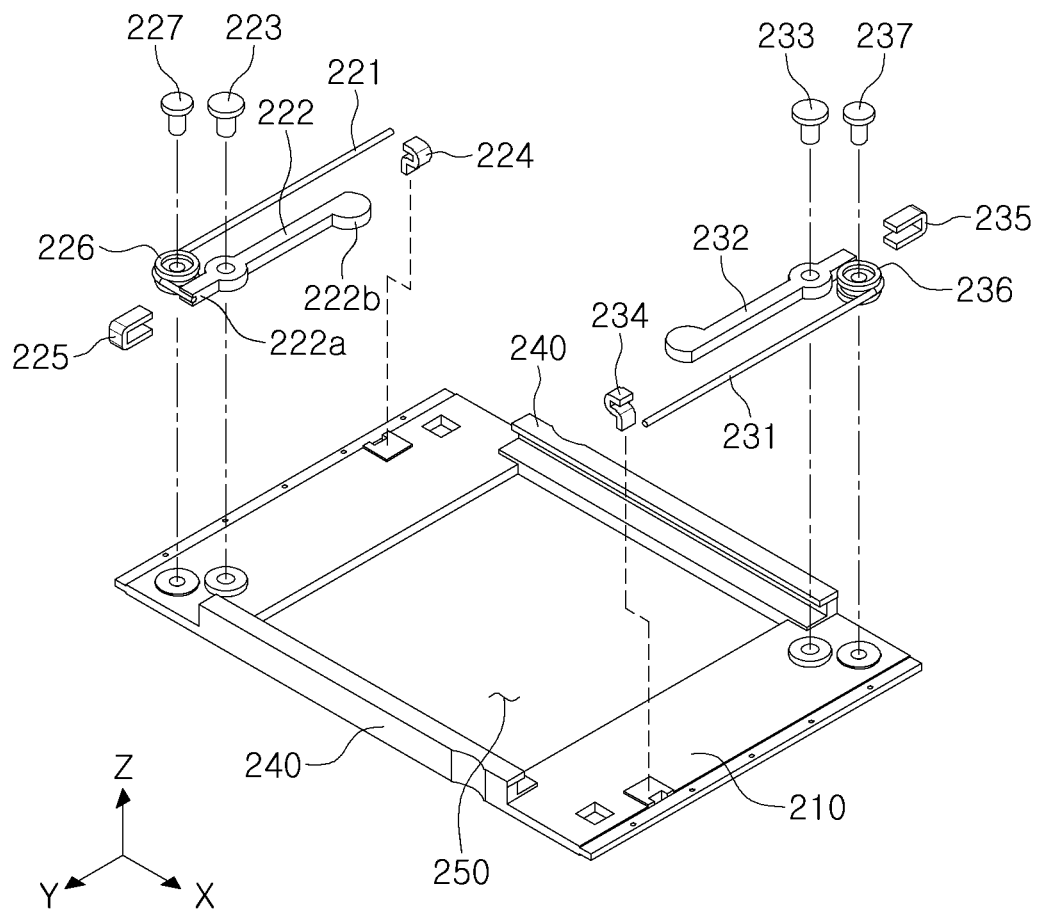
FIG. 13 is an exploded perspective view of a first sensor driving portion included in an image sensor module according to an example.

FIG. 13 is an exploded perspective view of a first sensor driving portion included in an image sensor module according to an example.

The first sensor driving portion 200 may move the image sensor 100 and the frame 110 on which the image sensor 100 is mounted in a first direction (for example, an X-axis direction) perpendicular to an optical axis (Z-axis) direction.

The first sensor driving portion 200 may include a moving plate 210 on which the frame 110 is disposed, and one or more driving units 220 and 230 provided on the moving plate 210 and moving the frame 110.

One of the driving units 220 and 230 may include wires 221 and 231 having lengths that change when power is applied to the wires 221 and 231, and may move the image sensor 100 with a driving force generated depending on the change in the lengths of the wires 221 and 231.

The image sensor 100 or the frame 110 on which the image sensor 100 is mounted may be movably disposed on the moving plate 210.

For example, as illustrated in FIG. 13, the moving plate 210 may include a first guide unit 240 provided on the moving plate 210 and extending in the first direction (the X-axis direction). The first guide unit 240 may include a groove in which at least a portion of the frame 110 may be accommodated. At least a portion of the frame 110 may be inserted into the first guide unit 240 to be slidably moved in the direction (for example, the X-axis direction) in which the first guide unit 240 extends.

The first guide unit 240 may be provided as one or more first guide units 240. For example, two first guide units 240 may be provided on opposite edges of the moving plate 210 and may extend in the first direction (the X-axis direction).

The moving plate 210 may be provided as a plate-shaped member having at least a partial surface perpendicular to an optical axis (a Z-axis). Accordingly, the frame 110 may move along the moving plate 210 in a direction (for example, the X-axis direction) perpendicular to the optical axis (Z-axis). However, the shape of the moving plate 210 is not limited to a plate shape, and may have any of various shapes.

The moving plate 210 may have a first opening 250 in a portion facing the image sensor 100. The image sensor 100 disposed on an upper surface of the moving plate 210 may be exposed to the circuit board 400 below the moving plate 210 through the first opening 250.

The circuit board 400 may be disposed below the first sensor driving portion 200, and may be electrically connected to the image sensor 100 through the first opening 250 of the first sensor driving portion 200.

The first sensor driving portion 200 may include one or more driving units 220 and 230. For example, as illustrated in FIG. 13, the first sensor driving portion 200 may include a first driving unit 220 and a second driving unit 230 provided on opposite sides of the frame 110.

The first driving unit 220 and the second driving unit 230 may be spaced apart from each other in the first direction (the X-axis direction).

The first driving unit 220 and the second driving unit 230 of the first sensor driving portion 200 may be provided at positions that are different from positions of the first guide units 240 of the first sensor driving portion 200.

For example, the first driving unit 220 and the second driving unit 230 may be provided on opposite edges of the moving plate 210 on which the first guide units 240 are not provided.

For example, as illustrated in FIG. 13, when the moving plate 210 has a rectangular upper surface, the first guide units 240 may be provided on two opposite edges of the moving plate 210 spaced apart from each other in the second direction (the Y-axis direction), and the first driving unit 220 and the second driving unit 230 may be provided on two opposite edges of the moving plate 210 spaced apart from each other in the first direction (the X-axis direction).

One of the driving units 220 and 230 may move or rotate the image sensor 100 with respect to the moving plate 210. For example, the first driving unit 220 may move the frame 110 on which the image sensor 100 is mounted with respect to the moving plate 210 in the first direction (the X-axis direction).

The first driving unit 220 may include a third wire 221 having a length that changes when power is applied to the third wire 221, a first lever 222 connected to the third wire 221 and rotating about a predetermined rotation axis depending on the change in the length of the third wire 222, and a first lever shaft 223 forming a rotation axis of the first lever 222.

The third wire 221 may receive power from an external power source (not illustrated) outside the first sensor driving portion 200, and may have a length that changes when power is applied to the third wire 221.

For example, the third wire 221 may be a shape memory alloy wire having a length that changes when power is applied to the third wire 221. A change in the length of the third wire 221 may be proportional to the magnitude of a voltage or current applied to the third wire 221 or proportional to a time for which the voltage or current is applied.

At least a portion of the third wire 221 may be formed to extend in a direction (for example, a Y-axis direction) perpendicular to the optical axis (Z-axis). The third wire 221 may be contracted in a direction (for example, the Y-axis direction) perpendicular to the optical axis (the Z-axis) when power is applied to the third wire 221.

One end of the third wire 221 may be fixed to the moving plate 210 by a first fixed member 224. The first fixed member 224 may be made of a conductive material, and thus one end of the third wire 221 may be electrically connected to the external power source (not illustrated) via the first fixed member 224.

The other end of the third wire 221 may be connected to the first lever 222. In examples, a first connection member 225 may be further provided to connect the other end of the third wire 221 to the first lever 222. The first connection member 225 may be made of a conductive material, and thus the other end of the third wire 221 may be electrically connected to the external power source (not illustrated) via the first connection member 225.

For example, one end and the other end of the third wire 221 may be electrically connected to the external power source (not illustrated) to receive power. When power is applied to the third wire 221 and the length of the third wire 221 is contracted, a tension of the third wire 221 is transmitted to the first lever 222 connected to the third wire 221.

The first lever 222 may be rotatably supported on the moving plate 210 by the first lever shaft 223.

The first lever 222 may be provided as a rigid rod-shaped member. For example, as illustrated in FIG. 13, the first lever 222 may be provided as a rigid member continuously extending from a connection portion 222a connected to the third wire 221 to a contact portion 222b in contact with the frame 110. However, the shape of the first lever 222 illustrated in FIG. 13 is only an example, and the first lever 222 may be have any of various shapes.

The first lever 222 may rotate about a rotation axis formed by the first lever shaft 223. For example, as illustrated in FIG. 13, the first lever shaft 223 may penetrate through the first lever 222 to be coupled to the moving plate 210. Accordingly, the first lever 222 may rotate clockwise or counterclockwise around the lever shaft 223.

As illustrated in FIG. 13, the first lever shaft 223 may be an additional member inserted into the first lever 222. However, this is only an example, and the first lever shaft 223 may be integrated with the first lever 222. For example, the first lever shaft 223 may be integrated with the first lever 222, and may be rotatably supported by the moving plate 210.

The first lever 222 may include the connection portion 222a connected to the third wire 221. The connection portion 222a of the first lever 222 may be connected to the third wire 221 through the first connection member 225. The first connection member 225 may have a shape of a clip or a clamp fitted to the connection portion 222a of the first lever 222 in a state in which the connection portion 222a of the first lever 222 and the third wire 221 are in contact with each other.

The contact portion 222b of the first lever 222 may be provided to contact the frame 110. According to a change in the length of the third wire 221, the contact portion 222b of the first lever 222 may be rotated to push and move the frame 110.

For example, when the third wire 221 is contracted to rotate the connection portion 222a of the first lever 222, the contact portion 222b of the first lever 222 may also be rotated to push and move the frame 110.

In examples, a portion of the first lever 222 contacting the frame 110 may have a curved surface. For example, as illustrated in FIG. 13, a contact portion 222b at which the first lever 222 contacts the frame 110 may have a curved surface. Accordingly, the curved surface of the contact portion 222b may smoothly press the frame 110 while the first lever 222 rotates, and a moving distance of the frame 110 may be constantly changed depending on the amount of rotation of the first lever 222.

A portion of the third wire 221 may be wound around a first roller 226 to be connected to the first lever 222. For example, as illustrated in FIG. 13, at least a portion of the third wire 221 between one end connected to the first fixed member 224 and the other end connected to the first connection member 225 may be wound around the first roller 226 to extend in a different direction. Accordingly, the first roller 226 may be provided to change a direction in which the third wire 221 extends.

The first roller 226 may be rotatably provided on the moving plate 210, and may be provided so that a portion of the third wire 221 is wound around the first roller 226 to be rotatable in response to a change in the length of the third wire 221.

A rotation axis of the first roller 226 may be formed by a first roller shaft 227. The first roller shaft 227 may penetrate through the first roller 226 to be coupled to the moving plate 210. However, the first roller shaft 227 may be integrated with the first roller 226.

In examples, the first roller 226 may be provided to be adjacent to the connection portion 222a of the first lever 222. Accordingly, a portion of the third wire 221 extending from the first roller 226 to the connection portion 222a of the first lever 222 may be provided to be substantially perpendicular to the first lever 222. The third wire 221 is connected to the first lever 222 in a vertical state, so that the tension generated according to contraction of the length of the third wire 221 may generate a high torque in the first lever 222.

The first sensor driving portion 200 may further include a second driving unit 230 separate from the first driving unit 220. The second driving unit 230 may move the frame 110 in a first direction (an X-axis direction) perpendicular to an optical axis (a Z-axis).

In examples, the second driving unit 230 may have the same structure as the first driving unit 220. For example, the second driving unit 230 may include a fourth wire 231 having a length that changes when power is applied to the fourth wire 231, a second lever 232 connected to a fourth wire 231 and provided to be rotatable, and a second lever shaft 233 forming a rotation axis of the second lever 232.

In addition, the second driving unit 230 may include a second fixed member 234 that may fix the fourth wire 231 to the moving plate 210, and a second connection member 235 that may connect the second lever 232 and the fourth wire 231 to each other.

In addition, the second driving unit 230 may further include a second roller 236 around which a portion of the fourth wire 231 is wound, and a second roller shaft 237 forming a rotation axis of the second roller 236.

The fourth wire 231, the second lever 232, the second lever shaft 233, the second fixed member 234, the second connection member 235, the second roller 236, and the second roller shaft 237 may have the same structures as the third wire 221, the first lever 222, the first lever shaft 223, the first fixed member 224, and the first connection member 225, the first roller 226, and the first roller shaft 227, respectively, of the first driving unit 220 described above. Therefore, descriptions of the above-mentioned elements of the second driving unit 230 that are the same as or similar to those of the first driving unit 220 will be omitted herein, and only differences of the second driving unit 230 from the first driving unit 220 will be described below.

As illustrated in FIG. 13, the fourth wire 231 of the second driving unit 230 and the third wire 221 of the first driving unit 220 may be provided on opposite edges of the moving plate 210 and may extend parallel to each other.

A direction in which the third wire 221 extends from the first roller 226 toward the first fixed member 224 may be opposite to a direction in which the fourth wire 231 extends from the second roller 236 toward the second fixed member 234.

Since the first driving unit 220 and the second driving unit 230 are disposed to be spaced apart from each other in the first direction (the X-axis direction), a direction in which the frame 110 is driven by the first driving unit 220 and a direction in which the frame 110 is driven by the second driving unit 230 may be opposite to each other.

For example, the first driving unit 220 may move the frame 110 in a positive direction of the first direction (the X-axis direction), and the second driving unit 230 may move the frame 110 in a negative direction of the first direction (the X-axis direction).

For example, the frame 110 may be moved in both the positive and negative directions of the first direction (the X-axis direction) by the first driving unit 220 and the second driving unit 230.

Rotation directions of the first lever 222 and the second lever 232 according to the contraction of the third wire 221 and the fourth wire 231 may be the same.

For example, as the third wire 221 contracts, the first lever 222 may rotate clockwise to move the frame 110 in the positive direction of the first direction (the X-axis direction).

As the fourth wire 231 contracts, the second lever 232 may rotate clockwise to move the frame 110 in the negative direction of the first direction (the X-axis direction).

The first driving unit 220 and the second driving unit 230 may be controlled independently of each other. For example, only one of the first driving unit 220 and the second driving unit 230 may be driven, or the first driving unit 220 and the second driving unit 230 may be sequentially driven. Accordingly, the first sensor driving unit 200 may appropriately move the image sensor 100 in a direction (for example, the X-axis direction) perpendicular to the optical axis (the Z-axis) to perform an optical image stabilization (OIS) function.

In examples, the image sensor module 10 may further include a second sensor driving portion 300 which may move the image sensor 100 in a direction (for example, the Y-axis direction) different from the direction (for example, the X-axis direction) in which the first sensor driving portion 200 moves the image sensor 100.

Hereinafter, the second sensor driving portion 300 will be described with reference to FIG. 14.

Figure 14:
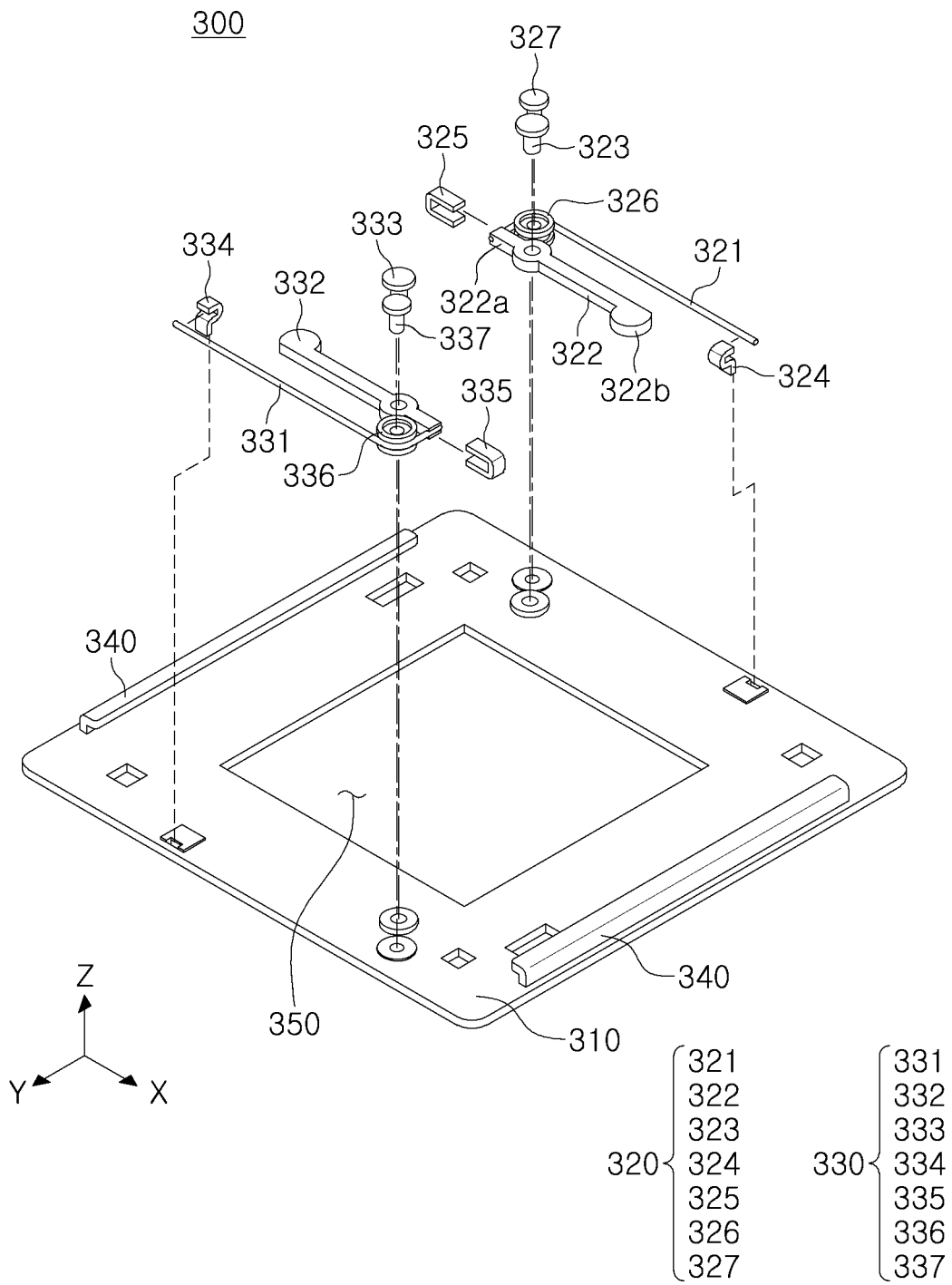
FIG. 14 is an exploded perspective view of a second sensor driving portion included in an image sensor module according to an example.

FIG. 14 is an exploded perspective view of a second sensor driving portion included in an image sensor module according to an example.

The second sensor driving portion 300 may move the first sensor driving portion 200 in a direction (for example, the Y-axis direction) perpendicular to the optical axis (the Z-axis). For example, the second sensor driving portion 300 may move the first sensor driving portion 200 in the second direction (the Y-axis direction) perpendicular to both the optical axis (Z-axis) direction and the first direction (the X-axis direction).

As the first sensor driving portion 200 is moved in the second direction (the Y-axis direction) by the second sensor driving portion 300, the image sensor 100 disposed on the first sensor driving portion 200 may also be moved together with the first sensor driving portion 200 in the second direction (the Y-axis direction).

For example, the second sensor driving portion 300 may move the first sensor driving portion 200 and the image sensor 100 together in the second direction (the Y-axis direction).

The second sensor driving portion 300 may include a base 310 on which the moving plate 210 of the first sensor driving portion 200 is disposed, and one or more driving units 320 and 330 provided on the base 310 and moving the moving plate 210.

The one or more driving units 320 and 330 may include wires 321 and 331 having lengths that change when power is applied to the wires 321 and 331, and may move the moving plate 210 with a driving force generated depending on the change in the length of the wires 321 and 331.

As illustrated in FIG. 14, the base 310 may include a second guide unit 340 extending in the second direction (the Y-axis direction). The second guide unit 340 may include a groove in which at least a portion of the moving plate 210 may be accommodated.

At least a portion of the moving plate 210 may be inserted into the second guide unit 340 to slidably move relative to an upper surface of the base 310 in a direction in which the second guide unit 340 extends. The second guide unit 340 may be provided as one or more second guide units 340. For example, two second guide units 340 may be provided on opposite edges of the base 310 and may extend in the second direction (the Y-axis direction).

In examples, a direction in which the second guide units 340 extend and a direction in which the first guide units 240 extend may be perpendicular to each other. For example, the first guide units 240 may extend in the first direction (the X-axis direction), and the second guide units 340 may extend in the second direction (the Y-axis direction).

Since the first guide units 240 and the second guide units 340 extend in directions perpendicular to each other, the frame 110 and the moving plate 210 may move along the first guide units 240 and the second guide units 340 in directions perpendicular to each other.

The base 310 may be provided as a plate-shaped member having at least a partial surface perpendicular to the optical axis (the Z-axis). Accordingly, the moving plate 210 may move along the base 310 in a direction perpendicular to the optical axis (the Z-axis). However, the shape of the base 310 is not limited to a plate shape, and the base 310 may have any of various shapes.

The base 310 may include a second opening 350 in a portion facing the image sensor 100. The second opening 350 of the base 310 and the first opening 250 of the moving plate 210 shown in FIG. 13 may be provided to communicate with each other. Accordingly, the circuit board 400 may be electrically connected to the image sensor 100 through the first opening 250 and the second opening 350.

The second sensor driving portion 300 may include one or more driving units 320 and 330. For example, as illustrated in FIG. 14, the second sensor driving portion 300 may include a third driving unit 320 and a fourth driving unit 330 provided on opposite sides of the base 310.

The one or more driving units 320 and 330 included in the second sensor driving portion 300 may move or rotate the first sensor driving portion 200 with respect to the base 310.

For example, the third driving unit 320 may move the first sensor driving portion 200 and the image sensor 100 together in the second direction (the Y-axis direction) with respect to the base 310. For example, the first sensor driving portion 200 and the image sensor 100 disposed in the first sensor driving portion 200 may be moved together in the second direction (the Y-axis direction) by a driving force generated by the third driving unit 320.

The one or more driving units 320 and 330 included in the second sensor driving portion 300 may have the same structure as the first driving unit 220 described with reference to FIG. 13. For example, the third driving unit 320 and the fourth driving unit 330 of the second sensor driving portion 300 may have the same structure as the first driving unit 220.

For example, the third driving unit 320 may include a fifth wire 321 having a length that changes when power is applied to the fifth wire 321, a third lever 322 connected to the fifth wire 321 and rotating about a predetermined rotation axis depending on the change in the length of the fifth wire 321, and a third lever shaft 323 forming a rotation axis of the third lever 322.

The third lever 322 of the third driving unit 320 may include a connection portion 322a and a contact portion 322b, and a third connection member 325 may be coupled to the connection portion 322a of the third lever 322. The fifth wire 321 may be fixed to the base 310 by a third fixed member 324.

The third driving unit 320 may further include a third roller 326 around which a portion of the fifth wire 321 is wound, and a third roller shaft 327 forming a rotation shaft of the third roller 326.

Similarly, the fourth driving unit 330 may include a sixth wire 331 having a length that changes when power is applied to the sixth wire 331, a fourth lever 332 connected to the sixth wire 331 and rotating about a predetermined rotation axis depending on the change in the length of the sixth wire 331, and a fourth lever shaft 333 forming a rotation axis of the fourth lever 332.

A fourth connection member 335 may be provided to connect the sixth wire 331 and the fourth lever 332 of the fourth driving unit 330 to each other. The sixth wire 331 may be fixed to the base 310 by a fourth fixed member 334. The fourth driving unit 330 may further include a fourth roller 336 around which a portion of the sixth wire 331 is wound, and a fourth roller shaft 337 forming a rotation axis of the fourth roller 336.

Hereinafter, descriptions of the above-mentioned elements of the third and fourth driving units 320 and 330 that are the same as or similar to those of the first driving unit 220 will be omitted, and only differences of third and fourth driving units 320 and 330 from the first driving unit 220 will be described below.

At least one of the driving units 320 and 330 included in the second sensor driving portion 300 according to examples may be provided on the base 310. For example, as illustrated in FIG. 14, the third driving unit 320 and the fourth driving unit 330 may be disposed on opposite edges of the base 310.

In examples, the driving units 320 and 330 of the second sensor driving portion 300 may be provided at positions that different from the positions of the second guide units 340 of the second sensor driving portion 300.

For example, the third driving unit 320 and the fourth driving unit 330 may be provided on opposite edges of the base 310 on which the second guide units 340 are not provided.

As illustrated in FIG. 14, when the base 310 has a rectangular upper surface, the second guide units 340 may be provided on two opposite edges of the base 310 spaced apart from each other in the first direction (the X-axis direction), and the third driving unit 320 and the fourth driving unit 330 may be provided on two opposite edges of the base 310 spaced apart from each other in the second direction (the Y-axis direction).

The third driving unit 320 and the fourth driving unit 330 of the second sensor driving portion 300 may be provided to be adjacent to the first guide units 240 of the first sensor driving portion 200. Accordingly, the third driving unit 320 and the fourth driving unit 330 of the second sensor driving portion 300 may push the first guide units 240 of the first sensor driving portion 200 to move the first sensor driving portion 200.

The fifth wire 321 of the third driving unit 320 and the sixth wire 331 of the fourth driving unit 330 may be provided on opposite edges of the base 310 and may extend parallel to each other.

A direction in which the fifth wire 321 extends from the third roller 326 toward the third fixed member 326 may be opposite to a direction in which the sixth wire 331 extends from the fourth roller 336 toward the fourth fixed member 334.

Since the third driving unit 320 and the fourth driving unit 330 are disposed to be spaced apart from each other in the second direction (the Y-axis direction), a direction in which the first sensor driving portion 200 is driven by the third driving unit 320 and a direction in which the first sensor driving portion 200 is driven by the fourth driving unit 330 may be opposite to each other.

For example, the third driving unit 320 may push and move the first sensor driving portion 200 in a positive direction of the second direction (the Y-axis direction), and the fourth driving unit 330 may push and move the first sensor driving portion 200 in a negative direction of the second direction (the Y-axis direction).

For example, the first sensor driving portion 200 may be moved in both the positive and negative directions of the second direction (the Y-axis direction) by the third driving unit 320 and the fourth driving unit 330.

The third driving unit 320 and the fourth driving unit 330 of the second sensor driving portion 300 may be provided on opposite sides of the image sensor 100 in the second direction (the Y-axis direction), and the first driving unit 220 and the second driving unit 230 of the first sensor driving portion 200 may be provided on opposite sides of the image sensor 100 in the first direction (the X-axis direction) intersecting the section direction (the Y-axis direction). For example, when the image sensor module 10 is viewed from above, the first driving unit 220, the second driving unit 230, the third driving unit 320, and the fourth driving unit 330 may be provided to be adjacent to four side surfaces of the image sensor 100.

Hereinafter, a structure of the image sensor module 10 including the first to fourth driving units 220, 230, 320, and 330 according to examples will be described with reference to FIGS. 15 to 17.

Figure 15:
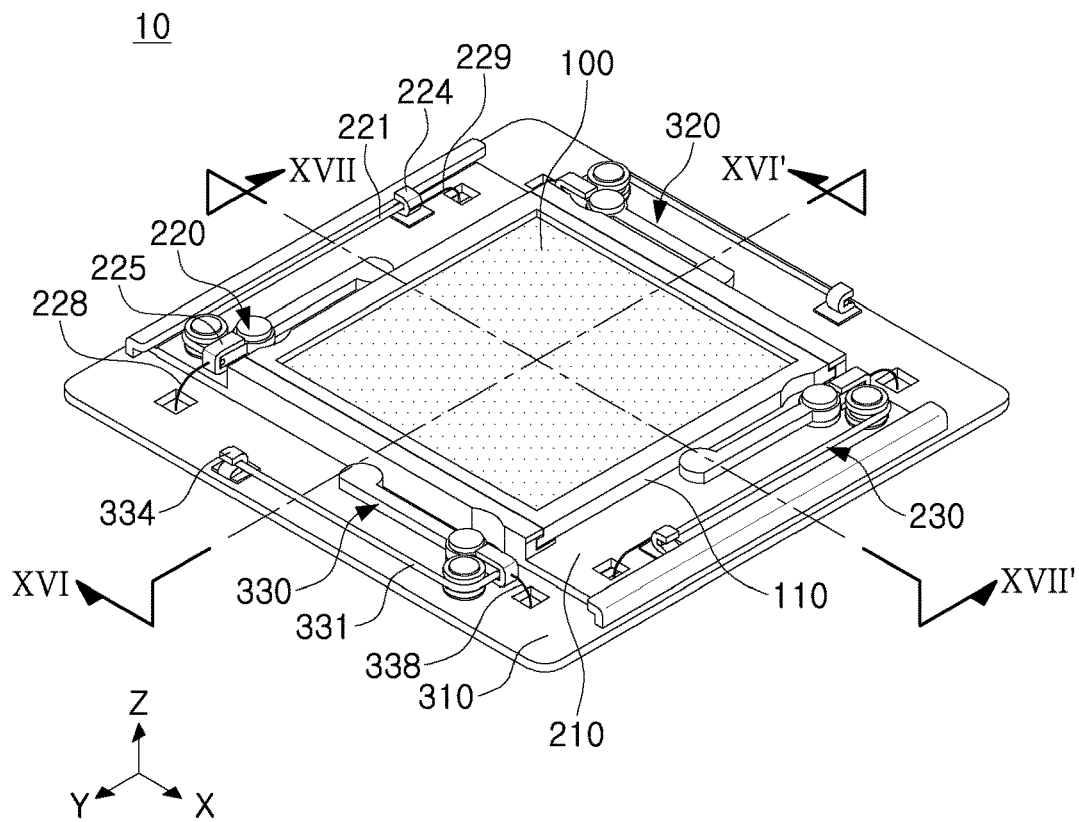
FIG. 15 is a perspective view of an image sensor module according to an example.
Figure 16:
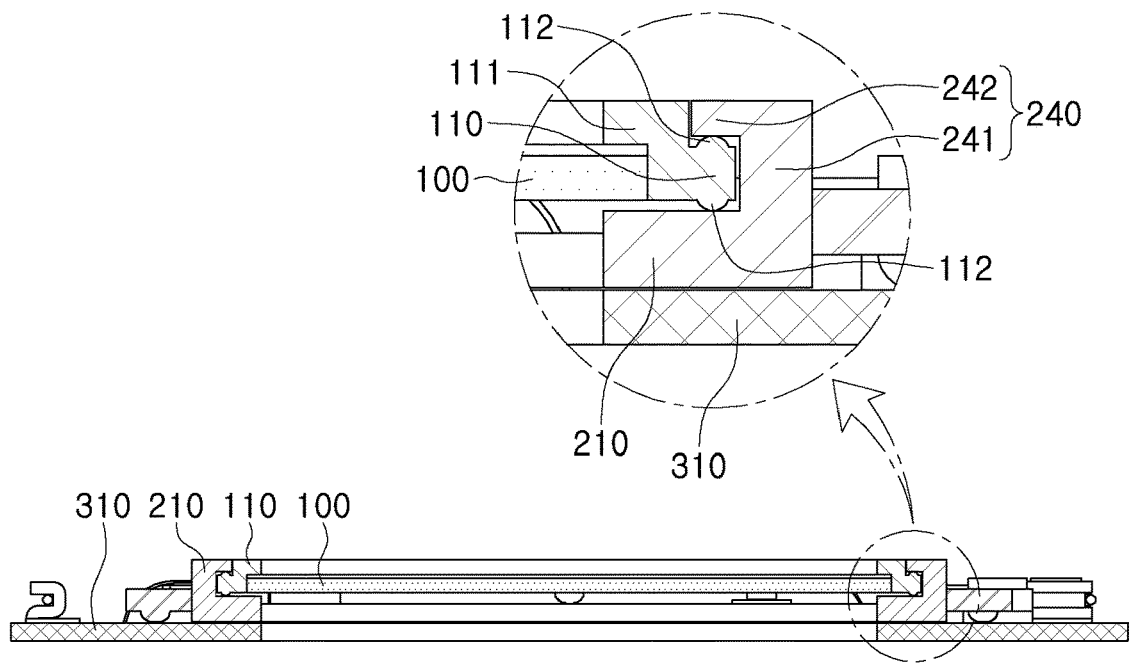
FIG. 16 is a cross-sectional view taken along the line XVI-XVI' in FIG. 15.
Figure 17:
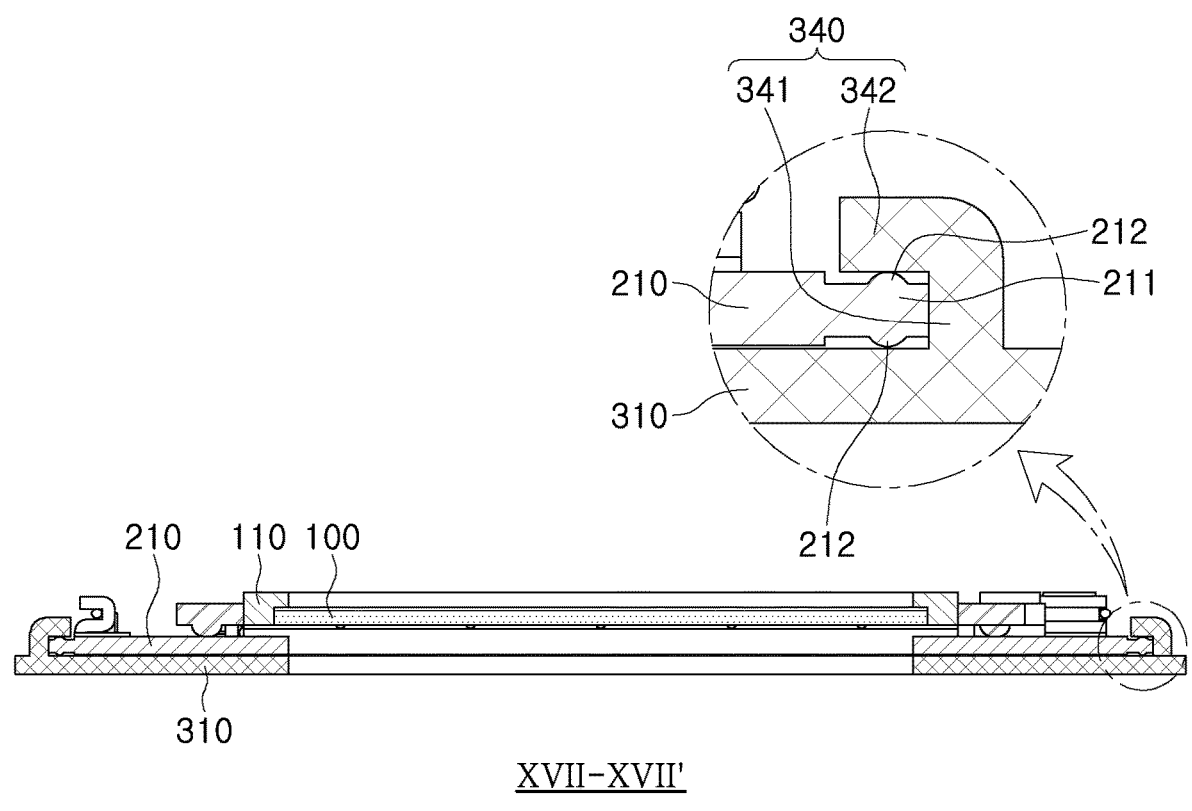
FIG. 17 is a cross-sectional view taken along the line XVII-XVII' in FIG. 15.

FIG. 15 is a perspective view of an image sensor module according to an example, FIG. 16 is a cross-sectional view taken along the line XVI-XVI' in FIG. 15, and FIG. 17 is a cross-sectional view taken along the line XVII-XVII' in FIG. 15.

The image sensor module 10 may include an image sensor 100 converting light incident in an optical axis (Z-axis) direction into an electrical signal, and one or more driving units 220, 230, 320, and 330 moving the image sensor 100.

The image sensor 100 may be disposed in the frame 110 having an opening. The frame 110 may be formed of a plate-shaped member having an opening, and light may be incident on the image sensor 100 through the opening. However, the shape of the frame 110 is not limited to a plate shape, and the frame 110 may have any of various shapes. Alternatively, the frame 110 may be integrated with the image sensor 100.

The frame 110 may be movably disposed on the moving plate 210 of the first sensor driving portion 200.

The moving plate 210 may be movably disposed on the base 310 of the second sensor driving portion 300.

The frame 110, the moving plate 210, and the base 310 may be stacked in the optical axis (Z-axis) direction. In addition, a circuit board 400 electrically connected to the image sensor 100 may be disposed below the base 310.

A direction in which the frame 110 moves with respect to the moving plate 210 and a direction in which the moving plate 210 moves with respect to the base 310 may intersect each other. For example, as illustrated in FIG. 15, the frame 110 may be provided to be movable with respect to the moving plate 210 in the first direction (the X-axis direction), and the moving plate 210 may be provided to be movable with respect to the base 310 in the second direction (the Y-axis direction).

Accordingly, the image sensor 100 coupled to the frame 110 may be provided to be movable in both the first direction (the X-axis direction) and the second direction (the Y-axis direction).

The image sensor module 10 may include one or more driving units 220, 230, 320, and 330 which may move the image sensor 100 in the direction of a plane (an X-Y plane) perpendicular to the optical axis (the Z-axis).

The plurality of driving units 220, 230, 320, and 330 included in the image sensor module 10 may be provided on different layers of the image sensor module 10.

For example, as illustrated in FIG. 15, the first and second driving units 220 and 230 may be provided on the moving plate 210, and the third and fourth driving units 320 and 330 may be provided on the base 310 disposed below the moving plate 210.

The plurality of wires included in the plurality of driving units 220, 230, 320, and 330 may move the image sensor 100 in a direction different from a length direction of the wires.

For example, a portion of the third wire 221 of the first driving unit 220 may be formed to extend in the second direction (the Y-axis direction), and as a length of the third wire 331 changes, the image sensor 100 is moved in the first direction (the X-axis direction) perpendicular to the second direction (the Y-axis direction).

In addition, a portion of the sixth wire 331 of the fourth driving unit 330 may be formed to extend in the first direction (the X-axis direction), and as a length of the sixth wire 331 changes, the image sensor 100 may be moved in the second direction (the Y-axis direction) perpendicular to the first direction (the X-axis direction).

The plurality of driving units 220, 230, 320, and 330 may be electrically connected to the circuit board 400 to be connected to an external power source (not illustrated). For example, as illustrated in FIG. 15, one end and the other end of the third wire 221 included in the first driving unit 220 may be connected to wires 228 and 229 to be electrically connected to the circuit board 400 to be connected to the external power source (not illustrated).

When the first fixed member 224 and the first connection member 225 are made of a conductive material, the wires 228 and 229 may be connected to the first fixed member 224 and the first connection member 225, respectively, to be electrically connected to the third wire 221. Accordingly, a closed circuit passing through the third wire 221 from the external power source (not illustrated) may be formed to allow a voltage or current to flow to the third wire 221. However, a connection structure between the third wire 221 and the external power source (not illustrated) is not limited to the above description. For example, at least one of the wires 228 and 229 respectively connected to one end and the other end of the third wire 221 may be omitted.

As illustrated in FIG. 15, one end of the sixth wire 331 may be connected to the fourth fixed member 334, and the fourth fixed member 334 may be directly electrically connected to the circuit board 400. Accordingly, the one end of the sixth wire 331 may be electrically connected to the circuit board 400 without an electric wire. The other end of the sixth wire 331 may be connected to the circuit board 400 through an electric wire 338.

The frame 110 may be disposed on the moving plate 210 to move in a direction (for example, the X-axis direction) perpendicular to the optical axis (the Z-axis). The moving plate 210 may be provided with first guide units 240 guiding the movement of the frame 110.

Referring to FIG. 16, the first guide units 240 may include a first extension portion 241 extending from the moving plate 210 in the optical axis (Z-axis) direction, and a first bent portion 242 bent from the first extension portion 241 in a direction (for example, the Y-axis direction) intersecting the optical axis (the Z-axis).

The first extension portion 241 may be formed to be substantially vertical, and the first bent portion 242 and the moving plate 210 may be formed to be substantially horizontal. For example, the first guide units 240 may have an inverted L-shaped cross section and may be formed to extend along the moving plate 210 in the first direction (the X-axis direction) perpendicular to the optical axis (the Z-axis).

At least a portion of the frame 110 may be inserted between the first bent portion 242 and the moving plate 210 to slidably move in the first direction (the X-axis direction) in which the first guide units 240 extend.

Alternatively, the first guide units 240 may be provided with a first guide groove surrounded by the moving plate 210, the first extension portion 241, and the first bent portion 242, and at least a portion of the frame 110 may be inserted into the first guide groove to slidably move in the first direction (the X-axis direction).

The first guide units 240 may be provided on opposite edges of the moving plate 210. In this case, the first bent portions 242 included in the first guide units 240 may be provided to be bent from the first extension portions 241 included in the first guide units 240 in directions facing each other.

To reduce friction between the frame 110 and the moving plate 210, one or more friction reducing members may be provided where the frame 110 and the moving plate 210 are in contact with each other. In examples, friction reducing members 112 may be provided on a portion of the frame 110 inserted between the first bent portion 242 and the moving plate 210.

For example, as illustrated in FIG. 16, the frame 110 may include a first insertion portion 111 inserted into the first guide units 240 of the moving plate 210, and the friction reducing members 112 may be provided on the first insertion portion 111. The friction reducing members 112 may be projection-shaped members reducing a contact area between the frame 110 and the moving plate 210.

When the friction reducing members 112 have a projection shape, the friction reducing members 112 may be provided to protrude from the upper and lower surfaces of the first insertion portion 111. Alternatively, a friction reducing member (not illustrated) may be provided to protrude from an end portion of the first insertion portion 111 in a direction perpendicular to the optical axis (the Z-axis). In examples, the friction reducing members 112 may be integrated with the frame 110. However, the friction reducing members 112 are not limited thereto, and may include, for example, a bushing, a linear bearing, or a ball bearing. Alternatively, friction reducing members (not illustrated) may be provided on the first guide units 240 of the moving plate 210.

The frame 110 may contact with the moving plate 210 via the friction reducing members 112. For example, the other portions of the frame 110, other than the friction reducing members 112, may be provided to be spaced apart from the moving plate 210 by a predetermined interval. Accordingly, a frictional force generated between the frame 110 and the moving plate 210 may be significantly low.

In examples, a lubricating material may be applied between the friction reducing members 112 and the first guide units 240 or the moving plate 210 to reduce friction therebetween.

The moving plate 210 may be disposed on the base 310 to move in a direction (for example, the Y-axis direction) perpendicular to the optical axis (the Z-axis). In examples, the base 310 may be provided with second guide units 340 guiding the movement of the moving plate 210.

Referring to FIG. 17, the second guide units 340 may include a second extension portion 341 extending from the base 310 in the optical axis (Z-axis) direction, and a second bent portion 342 bent from the second extension portion 341 in a direction (for example, the X-axis direction) intersecting the optical axis (the Z-axis). The second extension portion 341 may be formed to be substantially vertical, and the second bent portion 342 and the base 310 may be formed to be substantially horizontal. For example, the second guide units 340 may have an inverted L-shaped cross-section and may extend along the base 310 in a second direction (for example, the Y-axis direction) perpendicular to the optical axis (the Z-axis).

At least a portion of the moving plate 210 may be inserted between the second bent portion 342 and the base 310 to slidably move in the second direction (the Y-axis direction) in which the second guide units 340 extend.

Alternatively, in examples, the second guide units 340 may be provided with a second guide groove surrounded by the base 310, the second extension 341, and the second bent portion 342, and at least a portion of the moving plate 210 may be inserted into the second guide groove to slidably move in the second direction (the Y-axis direction).

The second guide units 340 may be provided on opposite edges of the base 310. In this case, the second bent portions 342 included in the second guide units 340 may be provided to be bent from the second extension portions 341 included in the second guide units 340 in directions facing each other.

To reduce friction between the moving plate 210 and the base 310, one or more friction reducing members may be provided where the moving plate 210 and the base 310 are in contact with each other. In examples, friction reducing members 212 may be provided on a portion of the moving plate 210 inserted between the second bent portion 342 and the base 310.

For example, as illustrated in FIG. 17, the moving plate 210 may include a second insertion portion 211 inserted into the second guide units 340 of the base 310, and the friction reducing members 212 may be provided on the second insertion portion 211. The friction reducing members 212 may be projection-shaped members reducing a contact area between the moving plate 210 and the base 310.

When the friction reducing members 212 have a projection shape, the friction reducing members 212 may be provided to protrude from the upper and lower surfaces of the second insertion portion 211. Alternatively, a friction reducing member (not illustrated) may be provided to protrude from an end portion of the second insertion portion 211 in a direction perpendicular to the optical axis (the Z-axis). In examples, the friction reducing members 212 may be integrated with moving plate 210. However, the friction reducing members 212 are not limited thereto, and may include, for example, a bushing, a linear bearing, or a ball bearing. Alternatively, friction reducing members (not illustrated) may be provided on the second guide units 340 of the base 310.

The moving plate 210 may contact the base 310 via the friction reducing members 212. For example, the other portions of the moving plate 210, other than the friction reducing members 212, may be provided to be spaced apart from the base 310 by a predetermined interval. Accordingly, a frictional force generated between the moving plate 210 and the base 310 may be significantly low.

In examples, a lubricating material may be applied between the friction reducing members 212 and the second guide units 340 or the base 310 to reduce friction therebetween.

Hereinafter, driving of the driving units 220, 230, 320, and 330 according to examples will be described with reference to FIGS. 18A and 18B.

Figure 18A:
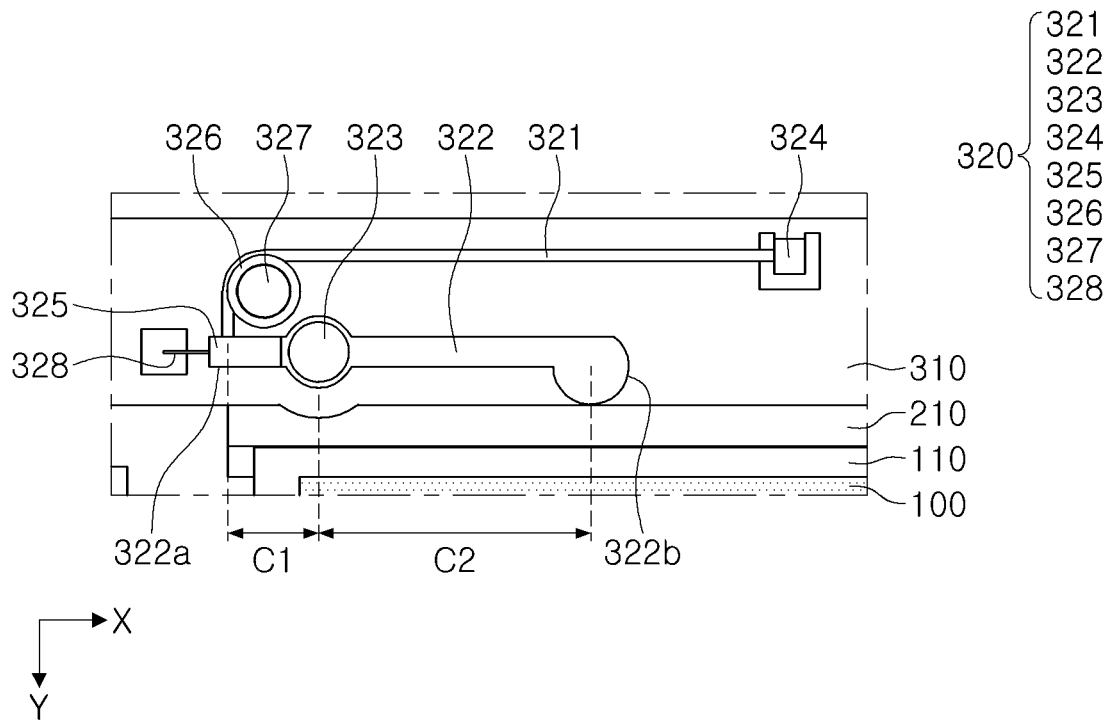
FIGS. 18A and 18B are reference views illustrating driving of a driving unit included in an image sensor module according to an example.
Figure 18B:
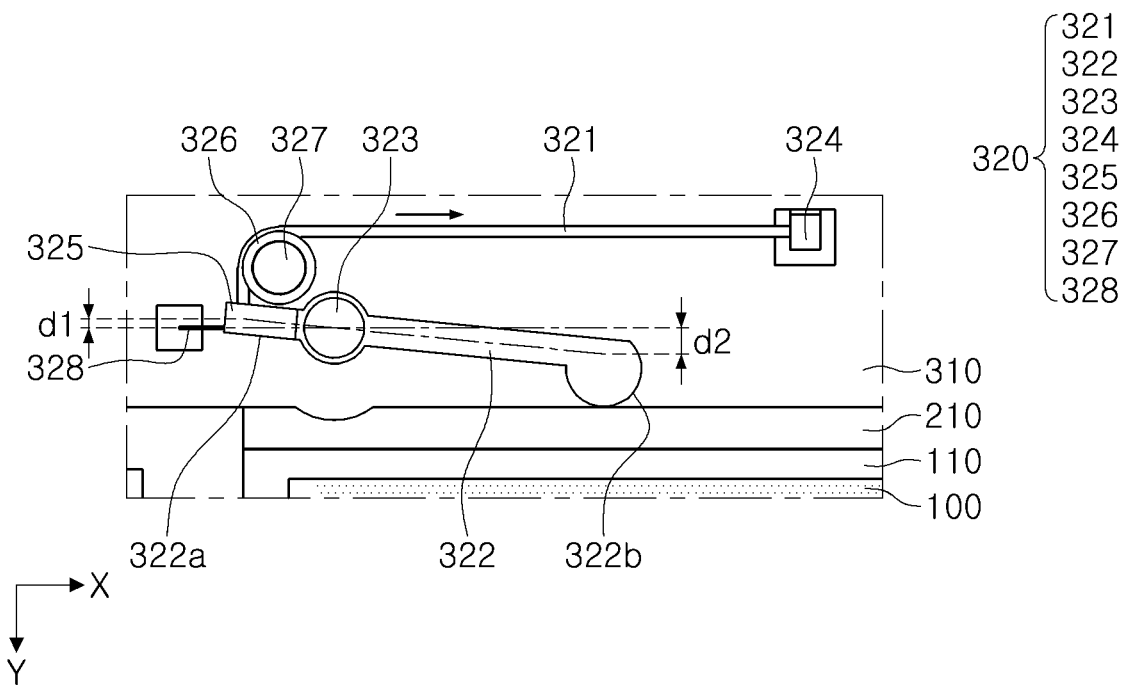

FIGS. 18A and 18B are reference views illustrating driving of a driving unit included in an image sensor module according to an example.

In FIGS. 18A and 18B, one drive unit (for example, a third driving unit 320) will be described, but the description thereof may be equally applied to other drive units (for example, first, second, and fourth driving units 220, 230, and 330). For example, in the following description, the driving unit 320 may correspond to one of the first to fourth driving units 220, 230, 320, and 330.

The driving unit 320 according to examples may include a wire 321 having a length that changes when power is applied to the wire 321, a lever 322 connected to the wire 321 and rotating according to the change in the length of the wire 321, and a lever shaft 323 forming a rotation axis of the lever 322.

The wire 321 may be electrically connected to an external power source (not illustrated) through an electric wire 328 to receive a voltage or current. One end of the wire 321 may be fixed to the base 310 by a fixed member 324, and another end of the wire 321 may be connected to the lever 322 by a connection member 325 to be movably provided. Accordingly, when the length of the wire 321 is contracts, the wire 321 may rotate the lever 322 by pulling the lever 322 connected to the wire 321 by the connection member 325.

The lever 322 may include a connection portion 322a connected to the wire 321, and a contact portion 322b contacting the moving plate 210. The connection portion 322a of the lever 322 may be moved together with the wire 321 depending on the change in the length of the wire 321, and the contact portion 322b may move the moving plate 210 and the image sensor 100 in a predetermined direction (for example, a Y-axis direction) according to the rotation of the lever 322.

In examples, the rotation shaft of the lever 322 may be provided between the connection portion 322a and the contact portion 322b. In this case, a distance from the connection portion 322a to the rotation shaft and a distance from the contact portion 322b to the rotation shaft may be different from each other.

For example, when a distance from the rotary shaft formed by the lever shaft 323 to the connection portion 322a is referred to as a first distance C1 and a distance from the rotary shaft to the contact portion 322b is referred to as a second distance C2, the first distance C1 may be smaller than the second distance C2 as illustrated in FIG. 18A.

Since the first distance C1 is smaller than the second distance C2, a trajectory of an arc drawn by the connection portion 322a according to the rotation of the lever 322 may be shorter than a trajectory of an arc drawn by the contact portion 322b.

In addition, since the second distance C2 is larger than the first distance C1, a moving distance of the contact portion 322b rotating depending on the change in the length of the wire 321 may be greater than the amount of the change in the length of the wire 321. Accordingly, a moving distance of the image sensor 100 moved by the contact portion 322b of the lever 322 may be relatively great compared with the amount of the change in the length of the wire 321.

For example, when a predetermined voltage is applied, the amount of change in the length of the wire 321 is referred to as a third distance d1 and a distance by which the image sensor 100 moves depending on the change in the length of the wire 321 is referred to as a fourth distance d2, the fourth distance d2 may be greater than the third distance d1.

For example, in the image sensor module 10 according to examples, the moving distance of the image sensor 100 may have a value greater than the amount of the change in the length of the wire 321 through a structure of the lever 322 in which the first distance C1 and the second distance C2 are different from each other.

Accordingly, a sufficient movement stroke of the image sensor 100 may be secured even when the amount of the change in the length of the wire 321 is small. Thus, the image sensor module 10 according to examples may more effectively perform an optical image stabilization (OIS) function using the movement of the image sensor 100.

FIGS. 19A to 19F are reference views illustrating driving of an image sensor in an image sensor module according to an example.

The first driving unit 220 and the second driving unit 230 may move the frame 110 to which the image sensor 100 is coupled. For example, the first driving unit 220 and/or the second driving unit 230 may move the frame 110 in the first direction (X-axis direction).

The first driving unit 220 and the second driving unit 230 may be provided on the moving plate 210 and may be independently controlled. For example, one of the first driving unit 220 and the second driving unit 230 may be driven, while the other thereof may not be driven.

Figure 19A:
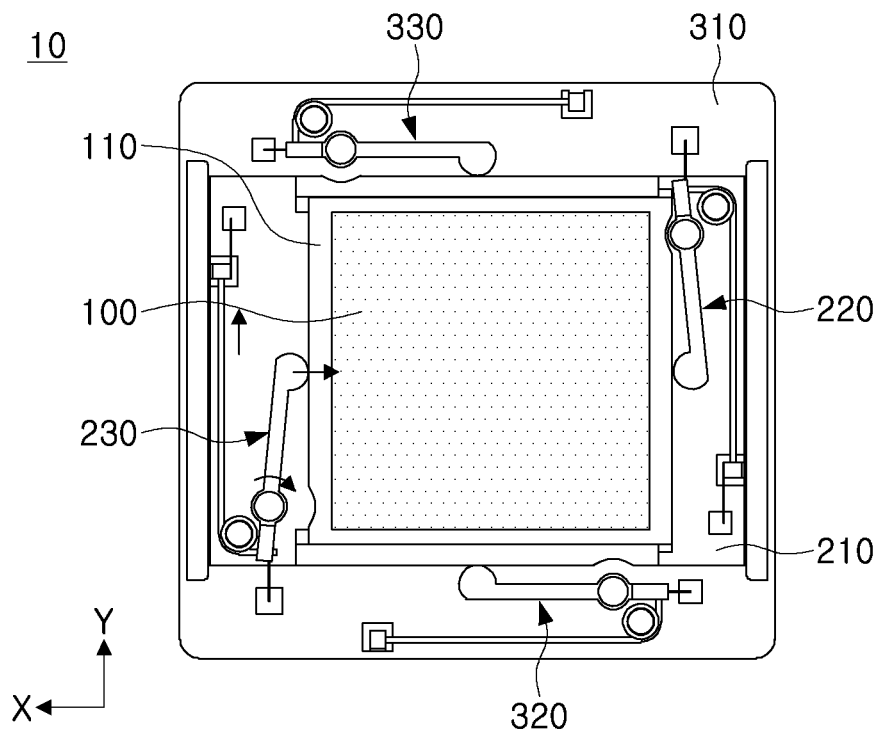
FIGS. 19A to 19F are reference views illustrating driving of an image sensor in an image sensor module according to an example.

For example, as illustrated in FIG. 19A, as the second driving unit 230 is driven, the image sensor 100 may move in a negative direction of the first direction (the X-axis direction).

Figure 19B:
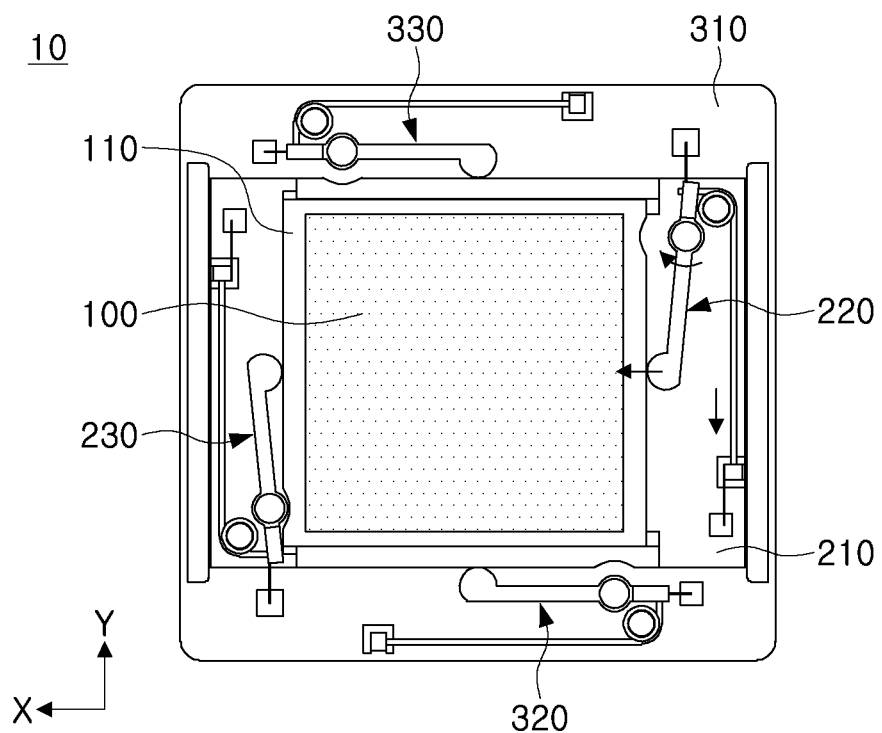

For example, as illustrated in FIG. 19B, as the first driving unit 220 is driven, the image sensor 100 may move in a positive direction of the first direction (the X-axis direction).

The first driving unit 220 and the second driving unit 230 may be driven simultaneously or sequentially. For example, the first driving unit 220 and the second driving unit 230 may simultaneously or sequentially receive currents or voltages having different magnitudes to precisely move the image sensor 100 to a desired position in the first direction (the X-axis direction).

The third driving unit 320 and the fourth driving unit 330 may be provided to move the moving plate 210, and as the moving plate 210 is moved by the third driving unit 320 and the fourth driving unit 330 in the second direction (the Y-axis direction), the image sensor 100 may also be moved together with the moving plate 210.

For example, the third driving unit 320 and the fourth driving unit 330 may move the moving plate 210 in the second direction (the Y-axis direction). As the moving plate 210 is moved, the first driving unit 220, the second driving unit 230, and the frame 110 provided on the moving plate 210 may also be moved.

The third driving unit 320 and the fourth driving unit 330 may be provided on the base 310 and may be independently controlled. For example, one of the third driving unit 320 and the fourth driving unit 330 may be driven, while the other thereof may not be driven.

Figure 19C:
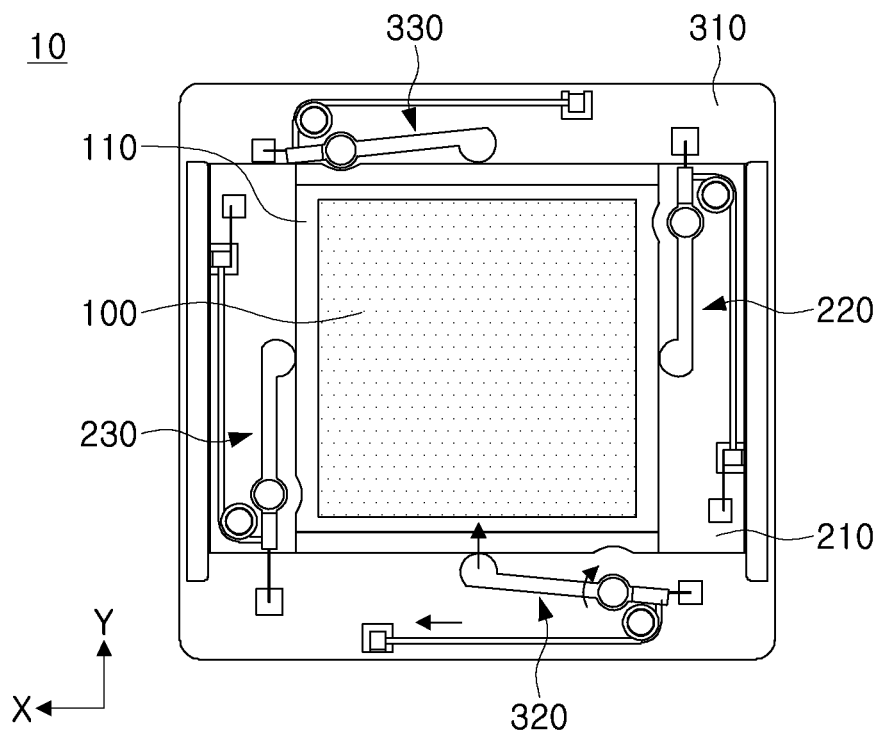

For example, as illustrated in FIG. 19C, as the third driving unit 320 is driven, the moving plate 210 and the image sensor 100 may be moved in the positive direction of the second direction (the Y-axis direction).

Figure 19D:
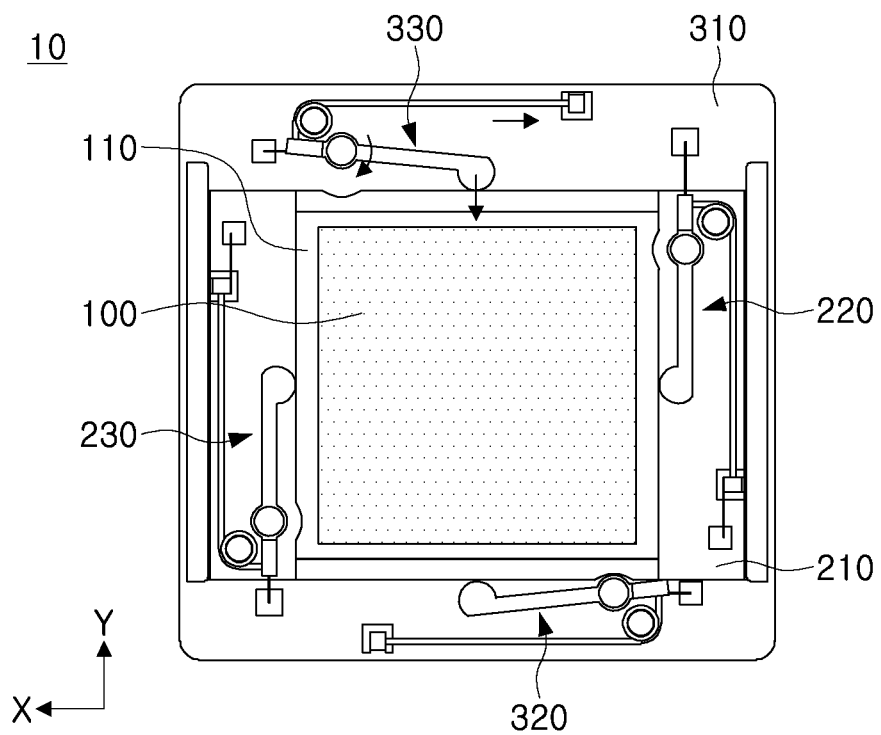

For example, as illustrated in FIG. 19D, as the fourth driving unit 330 is driven, the moving plate 210 and the image sensor 100 may be moved in the negative direction of the second direction (the Y-axis direction).

The third driving unit 320 and the fourth driving unit 330 may be driven simultaneously or sequentially. For example, the third driving unit 320 and the fourth driving unit 330 may simultaneously or sequentially receive currents or voltages having different magnitudes to precisely move the image sensor 100 to a desired position in the second direction (the Y-axis direction).

At least some of the first to fourth driving units 330 may be driven simultaneously or sequentially. Accordingly, the image sensor 100 may be moved in various directions on a plane (an X-Y plane) perpendicular to the optical axis (the Z-axis).

Figure 19E:
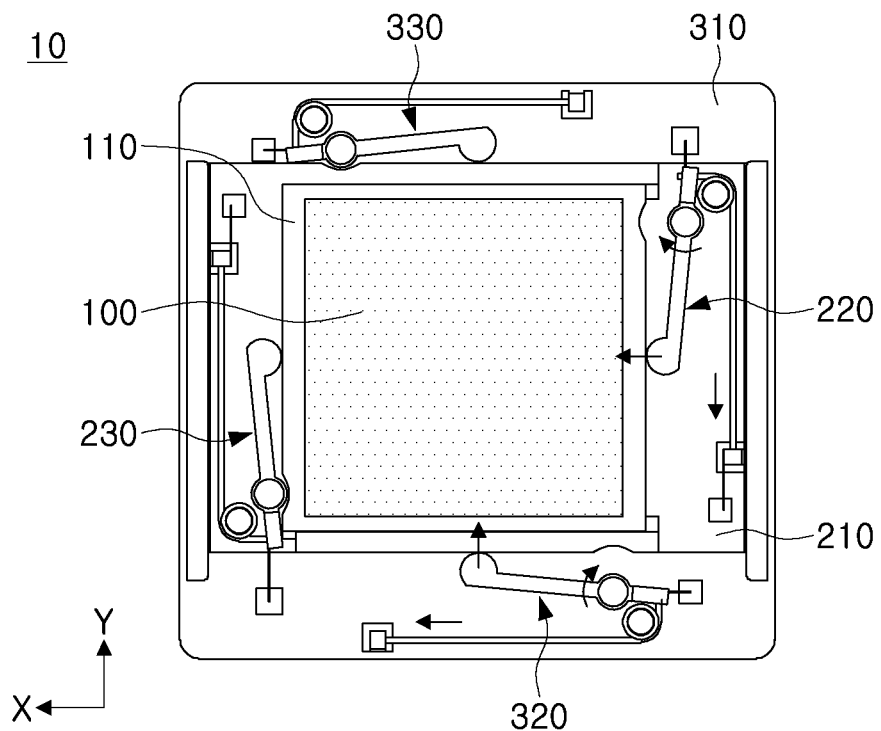

For example, as illustrated in FIG. 19E, the first driving unit 220 and the third driving unit 320 may be simultaneously driven. For example, while the third driving unit 320 moves the moving plate 210 in the positive direction of the second direction (the Y-axis), the first driving unit 220 may simultaneously move the frame 110 in the positive direction of the first direction (the X-axis direction).

Accordingly, the image sensor 100 may be rapidly moved in a diagonal direction between the positive direction of the first direction (the X-axis direction) and the positive direction of the second direction (the Y-axis direction) to perform an optical image stabilization (OIS) function.

Figure 19F:
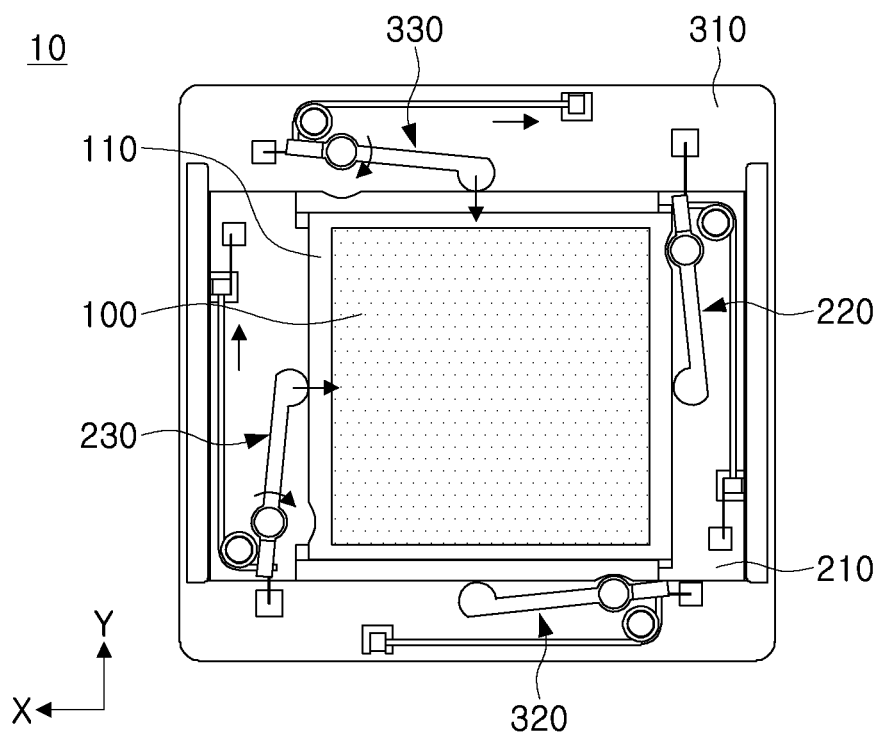

Alternatively, as illustrated in FIG. 19F, the second driving unit 230 and the fourth driving unit 330 may be simultaneously driven to rapidly move the image sensor 100 in a diagonal direction between the negative direction of the first direction the (X-axis direction) and the negative direction of the second direction (the Y-axis direction) to perform an OIS function.

In the image sensor module 10, a plurality of driving units 220, 230, 320, and 330 moving the image sensor 100 in different directions may be provided on different layers.

For example, the third driving unit 320 and the fourth driving unit 330 may be provided on the base 310, and the first driving unit 220 and the second driving unit 230 may be provided on the moving plate 210 disposed above the base 310.

Accordingly, even when the moving plate 210 is moved by the third driving unit 320 or the fourth driving unit 330, the first driving unit 220 and the second driving unit 230 may be maintained in the same positions with respect to the image sensor 100.

For example, relative positions between the first and second driving units 220 and 230 and the image sensor 100 may not be changed. Accordingly, the first driving unit 220 and the second driving unit 230 may precisely move the image sensor 100, irrespective of whether the third driving unit 320 or the fourth driving unit 330 is driven, to accurately perform an OIS function.

Figure 20:
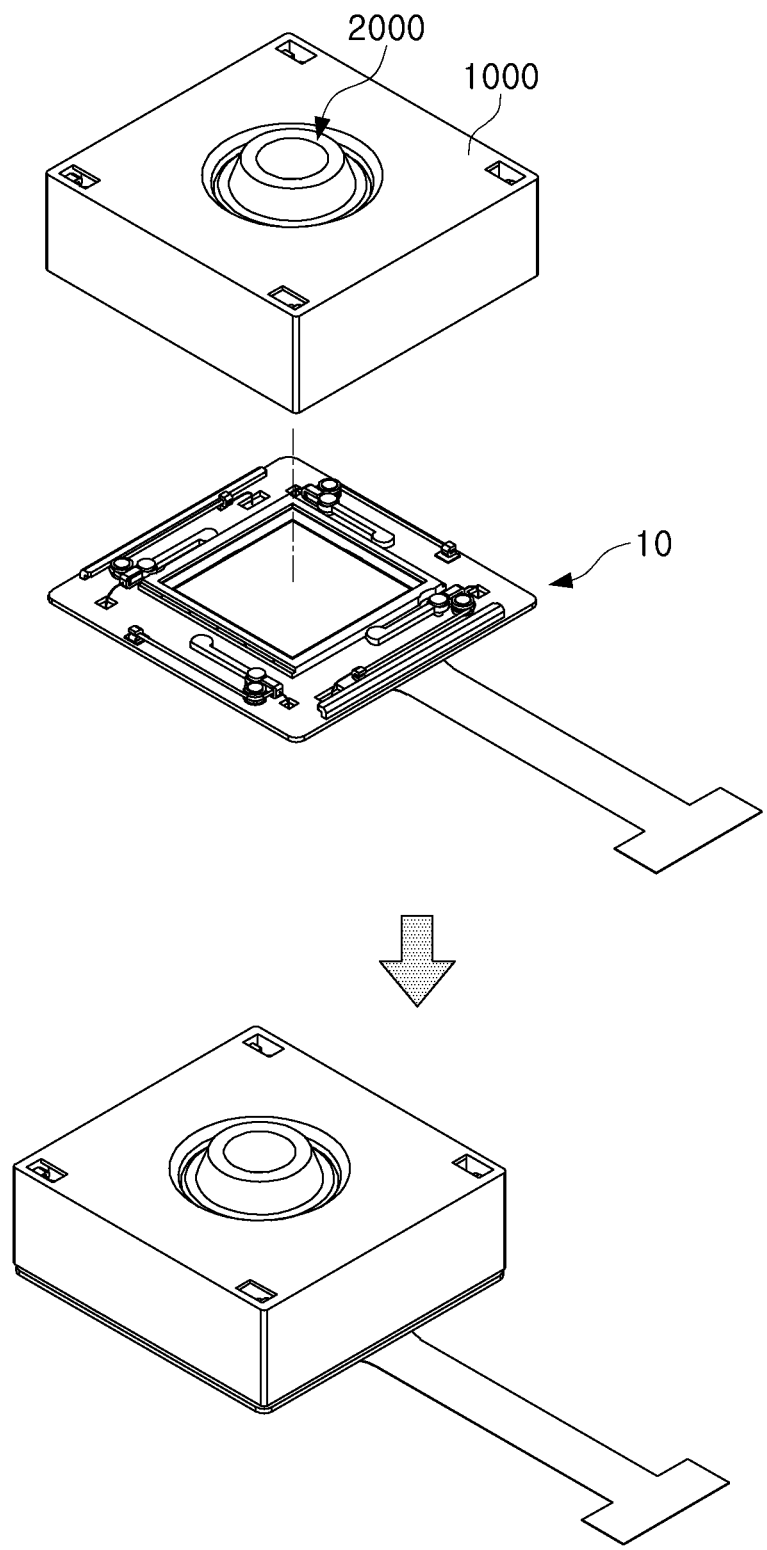
FIG. 20 is a view illustrating a state in which an image sensor module is coupled to a camera module according to an example.

FIG. 20 is a view illustrating a state in which an image sensor module is coupled to a camera module according to an example.

As illustrated in FIG. 20, an image sensor module 10 may be coupled to a lower portion of a housing 1000 of a camera module.

A lens module 2000 provided in the camera module may be moved in an optical axis (Z-axis) direction to focus lenses in the lens module 2000 on a subject, and the image sensor 100 provided in the image sensor module 10 independently of the lens module 200 may be moved in a direction (an X-axis direction and/or a Y-axis direction) perpendicular to the optical axis (the Z-axis) to compensate for shaking of the camera module.

As described above, a camera module according to an example may have a simple structure and a reduced size while implementing an autofocusing function and an optical image stabilization function.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing having an internal space;
a lens module disposed in the internal space of the housing to be slidably movable with respect to the housing; and
a driving portion configured to provide a driving force to move the lens module in an optical axis direction,
wherein the driving portion comprises a wire portion having a length that changes as power is applied to the wire portion,
the lens module comprises a guide portion configured to guide a movement of the lens module in the optical axis direction,
the wire portion is in contact with and supported by the guide portion,
the wire portion comprises a first wire and a second wire,
the first wire and the second wire are curved in opposing directions with respect to the guide portion,
the camera module further comprises a fixing projection disposed in the housing to support the first wire and the second wire, and
the first wire and the second wire are disposed to be spaced apart from each other in a direction perpendicular to the optical axis direction.

2. The camera module of claim 1, wherein the guide portion is in contact with an internal side surface of the housing.

3. The camera module of claim 1, wherein the guide portion comprises a guide projection protruding from a side surface of the lens module toward an internal side surface of the housing in a direction perpendicular to the optical axis direction.

4. The camera module of claim 3, wherein the internal side surface of the housing comprises a guide groove accommodating at least a portion of the guide projection.

5. The camera module of claim 4, wherein the guide groove extends in the optical axis direction.

6. The camera module of claim 1, wherein the guide portion comprises a first guide portion protruding in a first direction perpendicular to the optical axis direction, and a second guide portion protruding in a second direction perpendicular to both the optical axis direction and the first direction.

7. The camera module of claim 6, wherein the wire portion is in contact with and supported by the first guide portion and the second guide portion.

8. The camera module of claim 1, further comprising:
two first wire pins disposed in the housing; and
two second wire pins disposed in the housing,
wherein opposite ends of the first wire are fixed to the first wire pins, and
opposite ends of the second wire are fixed to the second wire pins.

9. The camera module of claim 1, wherein the fixing projection comprises:
a first groove in which the first wire is disposed; and
a second groove in which the second wire is disposed, and the first groove and the second groove are spaced apart from each other in a direction perpendicular to the optical axis direction.

10. The camera module of claim 1, further comprising an image sensor module coupled to the housing,
wherein the image sensor module comprises:
an image sensor;
a first sensor driving portion configured to move the image sensor in a first direction perpendicular to the optical axis direction; and
a second sensor driving portion configured to move the image sensor in a second direction perpendicular to both the optical axis direction and the first direction, and
the image sensor and the first sensor driving portion are moved together by the second sensor driving portion.

11. The camera module of claim 10, wherein the first sensor driving portion comprises:
a moving plate on which the image sensor is disposed;
a first lever rotatably disposed on the moving plate and configured to move the image sensor; and
a wire connected to the first lever and having a length that changes in response to power being applied to the wire connected to the first lever.

12. The camera module of claim 11, wherein the second sensor driving portion comprises:
a base on which the first sensor driving portion is disposed;
a second lever rotatably disposed on the base and configured to move the first sensor driving portion; and
a wire connected to the second lever and having a length that changes in response to power being applied to the wire connected to the second lever.

13. The camera module of claim 10, wherein the image sensor module further comprises a circuit board electrically connected to the image sensor, and
at least a portion of the circuit board is configured to be flexible.

14. An image sensor module comprising:
an image sensor; and
a first sensor driving portion configured to move the image sensor in a first direction parallel to a surface of the image sensor,
wherein the first sensor driving portion comprises a first wire having a length that changes in a second direction in response to power being applied to the first wire, the second direction being perpendicular to the first direction and parallel to the surface of the image sensor,
the first sensor driving portion is further configured to move the image sensor in the first direction in response to the length of the first wire changing in the second direction in response to the power being applied to the first wire,
the first sensor driving portion further comprises a first lever having a first end connected to one end of the first wire and configured to rotate and move the image sensor in the first direction in response to the length of the first wire changing in the second direction in response to the power being applied to the first wire, and
the image sensor module further comprises:
a frame in which the image sensor is disposed;
a plate; and
two first guide units disposed on opposite edges of the plate in the second direction, wherein the two first guide units are configured to support the frame so that the frame is movable in the first direction, and the first lever is rotatably mounted on the plate so that a second end of the first lever contacts the frame and pushes the frame and the image sensor in the first direction in response to the length of the first wire changing in the second direction in response to the power being applied to the first wire.

15. The image sensor module of claim 14, further comprising a second sensor driving portion configured to move the image sensor in the second direction, wherein the second sensor driving portion comprises a second wire having a length that changes in the first direction in response to power being applied to the second wire, and the second sensor driving portion is further configured to move the image sensor in the second direction in response to the length of the second wire changing in the first direction in response to the power being applied to the second wire.

16. An image sensor module comprising:

an image sensor; and a first sensor driving portion configured to move the image sensor in a first direction parallel to a surface of the image sensor, wherein the first sensor driving portion comprises a first wire having a length that changes in a second direction in response to power being applied to the first wire, the second direction being perpendicular to the first direction and parallel to the surface of the image sensor, the first sensor driving portion is further configured to move the image sensor in the first direction in response to the length of the first wire changing in the second direction in response to the power being applied to the first wire, the image sensor module further comprises a second sensor driving portion configured to move the image sensor in the second direction, the second sensor driving portion comprises a second wire having a length that changes in the first direction in response to power being applied to the second wire, the second sensor driving portion is further configured to move the image sensor in the second direction in response to the length of the second wire changing in the first direction in response to the power being applied to the second wire, the first sensor driving portion further comprises a first lever having a first end connected to one end of the first wire and configured to rotate and move the image sensor in the first direction in response to the length of the first wire changing in the second direction in response to the power being applied to the first wire, and the second sensor driving portion further comprises a second lever having a first end connected to one end of the second wire and configured to rotate and move the image sensor in the second direction in response to the length of the second wire changing in the first direction in response to the power being applied to the second wire.

17. The image sensor module of claim 16, further comprising:

a frame in which the image sensor is disposed;

a moving plate;

two first guide units disposed on opposite edges of the moving plate in the second direction;

a base; and two second guide units disposed on opposite edges of the base in the first direction, wherein the two first guide units are configured to support the frame so that the frame is movable in the first direction, the first lever is rotatably mounted on the moving plate so that a second end of the first lever contacts the frame and pushes the frame and the image sensor in the first direction in response to the length of the first wire changing in the second direction in response to the power being applied to the first wire, the two second guide units are configured to support the moving plate so that the moving plate is movable in the second direction, and the second lever is rotatably mounted on the base so that a second end of the second lever contacts one of the two first guide units and pushes the movable plate, the frame, and the image sensor in the second direction in response to the length of the second wire changing in the first direction in response to the power being applied to the second wire.

* * * * *